(12) United States Patent
Meyer et al.

(10) Patent No.: US 11,769,163 B2
(45) Date of Patent: Sep. 26, 2023

(54) SERVICE CALL-AHEAD SYSTEM AND METHOD

(71) Applicant: RXO Last Mile, Inc., Marietta, GA (US)

(72) Inventors: Karl Meyer, Atlanta, GA (US); Jonathan Turner, Marietta, GA (US)

(73) Assignee: RXO Last Mile, Inc., Marietta, GA (US)

( * ) Notice: Subject to any disclaimer, the term of this patent is extended or adjusted under 35 U.S.C. 154(b) by 667 days.

(21) Appl. No.: 14/664,385

(22) Filed: Mar. 20, 2015

(65) Prior Publication Data
US 2015/0193778 A1 Jul. 9, 2015

Related U.S. Application Data

(63) Continuation of application No. 12/959,900, filed on Dec. 3, 2010, now abandoned.
(Continued)

(51) Int. Cl.
*G06Q 10/0631* (2023.01)
*G06Q 10/083* (2023.01)
(Continued)

(52) U.S. Cl.
CPC ......... *G06Q 30/0203* (2013.01); *G06Q 10/00* (2013.01); *G06Q 10/0631* (2013.01);
(Continued)

(58) Field of Classification Search
None
See application file for complete search history.

(56) References Cited

U.S. PATENT DOCUMENTS

| 4,153,874 A | 5/1979 | Kaestner |
| 5,400,020 A | 3/1995 | Jones et al. |

(Continued)

FOREIGN PATENT DOCUMENTS

| CA | 2723506 | 4/2020 |
| WO | 2002044829 | 6/2006 |
| WO | 2008107880 | 9/2008 |

OTHER PUBLICATIONS

Dempsey, "New Trends in Rapid Response Manufacturing Logistics," 1999, in Hadjiconstantinou, "Quick Response in the Supply Chain," 1999, Springer-Verlag Berlin Heidelberg New York, Chapter 11, pp. 97-130.*
(Continued)

*Primary Examiner* — Ivan R Goldberg
(74) *Attorney, Agent, or Firm* — Taylor English Duma LLP

(57) ABSTRACT

Examples of service call-ahead systems and methods are disclosed. In one example implementation according to aspects of the present disclosure, a service order management system includes a processing device, a servicer device, and a memory device. The service order management system is enabled at least to prompt a servicer to modify an initial estimated time of arrival (ETA) and notify a customer of the modified ETA of a servicer at a service destination. Prompting the servicer to modify the initial ETA enables the processing device to notify the customer of the modified ETA, which is more accurate than the initial ETA. Other service call-ahead and notification techniques are also disclosed.

9 Claims, 19 Drawing Sheets

Related U.S. Application Data

(60) Provisional application No. 61/266,599, filed on Dec. 4, 2009.

(51) Int. Cl.
| | | |
|---|---|---|
| *G06Q 30/0203* | (2023.01) | |
| *G06Q 10/00* | (2023.01) | |
| *G06Q 30/02* | (2023.01) | |
| *G06Q 30/0282* | (2023.01) | |
| *G06Q 10/0833* | (2023.01) | |
| *G06Q 30/016* | (2023.01) | |
| *G06Q 10/1093* | (2023.01) | |
| *G08G 1/123* | (2006.01) | |

(52) U.S. Cl.
CPC ..... *G06Q 10/06311* (2013.01); *G06Q 10/083* (2013.01); *G06Q 10/0833* (2013.01); *G06Q 30/016* (2013.01); *G06Q 30/02* (2013.01); *G06Q 30/0282* (2013.01); *G06Q 10/1095* (2013.01); *G08G 1/123* (2013.01)

(56) References Cited

U.S. PATENT DOCUMENTS

| | | | |
|---|---|---|---|
| 5,444,444 A | 8/1995 | Ross | |
| 5,623,260 A | 4/1997 | Jones | |
| 5,648,770 A | 7/1997 | Ross | |
| 5,657,010 A | 8/1997 | Jones | |
| 5,668,543 A | 9/1997 | Jones | |
| 5,987,377 A * | 11/1999 | Westerlage | G08G 1/202 |
| | | | 701/465 |
| 6,167,255 A | 12/2000 | Kennedy et al. | |
| 6,278,936 B1 | 8/2001 | Jones | |
| 6,313,760 B1 | 11/2001 | Jones | |
| 6,317,060 B1 | 11/2001 | Jones | |
| 6,363,254 B1 | 3/2002 | Jones et al. | |
| 6,363,323 B1 | 3/2002 | Jones | |
| 6,370,231 B1 | 4/2002 | Hice | |
| 6,411,891 B1 * | 6/2002 | Jones | G06Q 10/08 |
| | | | 342/357.395 |
| 6,415,207 B1 | 7/2002 | Jones | |
| 6,486,801 B1 | 11/2002 | Jones | |
| 6,492,912 B1 | 12/2002 | Jones | |
| 6,510,383 B1 | 1/2003 | Jones | |
| 6,535,743 B1 * | 3/2003 | Kennedy, III | G08G 1/096872 |
| | | | 340/988 |
| 6,618,668 B1 | 9/2003 | Laird | |
| 6,683,542 B1 | 1/2004 | Jones | |
| 6,700,507 B2 | 3/2004 | Jones | |
| 6,714,859 B2 | 3/2004 | Jones | |
| 6,724,887 B1 | 4/2004 | Eilbacher et al. | |
| 6,741,927 B2 | 5/2004 | Jones | |
| 6,748,318 B1 | 6/2004 | Jones | |
| 6,748,320 B2 | 6/2004 | Jones | |
| 6,763,299 B2 | 7/2004 | Jones | |
| 6,763,300 B2 | 7/2004 | Jones | |
| 6,804,606 B2 | 10/2004 | Jones | |
| 6,859,722 B2 | 2/2005 | Jones | |
| 6,904,359 B2 | 6/2005 | Jones | |
| 6,952,645 B1 | 10/2005 | Jones | |
| 6,962,531 B2 | 11/2005 | Pace et al. | |
| 6,975,998 B1 | 12/2005 | Jones | |
| 6,980,131 B1 * | 12/2005 | Taylor | G08G 1/20 |
| | | | 340/988 |
| 7,026,925 B2 | 4/2006 | Roche et al. | |
| 7,030,781 B2 | 4/2006 | Jones | |
| 7,050,569 B1 | 5/2006 | Weaver et al. | |
| 7,089,107 B2 | 8/2006 | Jones | |
| 7,191,058 B2 | 3/2007 | Laird et al. | |
| 7,191,142 B1 * | 3/2007 | Sandell | G06Q 10/063114 |
| | | | 705/7.15 |
| 7,251,312 B2 | 7/2007 | D'Evelyn et al. | |
| 7,400,970 B2 | 7/2008 | Jones | |
| 7,509,266 B2 | 3/2009 | Rogers et al. | |
| 7,558,380 B2 | 7/2009 | Divenuta et al. | |
| 7,609,832 B2 | 10/2009 | Kreiner et al. | |
| 8,165,773 B1 | 4/2012 | Chavez et al. | |
| 11,669,799 B2 | 6/2023 | Meyer et al. | |
| 2002/0016726 A1 * | 2/2002 | Ross | G06Q 10/08 |
| | | | 705/339 |
| 2002/0062251 A1 | 5/2002 | Anandan et al. | |
| 2002/0173934 A1 | 11/2002 | Potenza | |
| 2003/0022087 A1 | 1/2003 | Tachi | |
| 2003/0098802 A1 | 5/2003 | Jones | |
| 2003/0223566 A1 * | 12/2003 | Book | H04M 3/42153 |
| | | | 379/219 |
| 2003/0233190 A1 | 12/2003 | Jones | |
| 2004/0030604 A1 | 2/2004 | Young | |
| 2004/0093290 A1 * | 5/2004 | Doss | G06Q 10/06314 |
| | | | 705/35 |
| 2004/0122721 A1 * | 6/2004 | Lasorsa | G06Q 10/109 |
| | | | 705/7.24 |
| 2004/0172323 A1 | 9/2004 | Stamm | |
| 2004/0230438 A1 | 11/2004 | Pasquale et al. | |
| 2004/0243430 A1 * | 12/2004 | Horstemeyer | H04L 63/08 |
| | | | 340/928 |
| 2005/0069103 A1 * | 3/2005 | DiVenuta | G06Q 40/08 |
| | | | 379/88.18 |
| 2005/0111955 A1 | 5/2005 | Truan et al. | |
| 2005/0114167 A1 | 5/2005 | McEvoy | |
| 2005/0154626 A1 * | 7/2005 | Jones | G06Q 10/0631 |
| | | | 705/7.12 |
| 2005/0171856 A1 | 8/2005 | Takahashi et al. | |
| 2006/0026047 A1 | 2/2006 | Jones | |
| 2006/0047419 A1 | 3/2006 | Diendorf et al. | |
| 2006/0085203 A1 * | 4/2006 | Schweickart | G06Q 10/06 |
| | | | 705/341 |
| 2006/0097896 A1 | 5/2006 | Jones | |
| 2006/0111089 A1 | 5/2006 | Winter et al. | |
| 2006/0111955 A1 * | 5/2006 | Winter | G06Q 10/06 |
| | | | 705/7.19 |
| 2007/0061471 A1 * | 3/2007 | Glover | G06Q 50/30 |
| | | | 709/228 |
| 2007/0071184 A1 | 3/2007 | Clift et al. | |
| 2007/0233549 A1 | 10/2007 | Watson et al. | |
| 2007/0255491 A1 * | 11/2007 | Geelen | G01C 21/26 |
| | | | 701/465 |
| 2007/0282661 A1 | 12/2007 | Franco | |
| 2008/0021762 A1 | 1/2008 | Coon et al. | |
| 2008/0040189 A1 | 2/2008 | Tong et al. | |
| 2008/0046280 A1 | 2/2008 | Horstemeyer | |
| 2008/0082257 A1 * | 4/2008 | Lee | G01C 21/343 |
| | | | 701/465 |
| 2008/0169937 A1 | 7/2008 | Lowry | |
| 2008/0234927 A1 | 9/2008 | O'Neill | |
| 2008/0275582 A1 | 11/2008 | Nettles et al. | |
| 2008/0298350 A1 | 12/2008 | Croak et al. | |
| 2009/0005038 A1 | 1/2009 | Yasrebi et al. | |
| 2009/0083078 A1 * | 3/2009 | Landstrom | G06Q 10/08 |
| | | | 705/4 |
| 2009/0089135 A1 | 4/2009 | Minert et al. | |
| 2009/0125425 A1 * | 5/2009 | Kloostra | G06Q 10/08 |
| | | | 705/29 |
| 2009/0157449 A1 | 6/2009 | Itani et al. | |
| 2009/0204472 A1 | 8/2009 | Einhorn | |
| 2009/0220056 A1 | 9/2009 | Simpson et al. | |
| 2009/0281929 A1 * | 11/2009 | Boitet | G06Q 10/08 |
| | | | 705/28 |
| 2010/0141514 A1 * | 6/2010 | Bell | G01S 5/0027 |
| | | | 342/357.31 |
| 2011/0137698 A1 | 6/2011 | Meyer et al. | |
| 2011/0295078 A1 | 12/2011 | Reid et al. | |
| 2012/0059681 A1 | 3/2012 | Meyer | |
| 2019/0370741 A1 | 12/2019 | Meyer et al. | |

OTHER PUBLICATIONS

Zhu, "Designing and Evaluating a Web-Based Collaboration Application: A Case Study," 2001, in MJ Smith, et al., "Usability Evaluation and Interface Design: Cognitive Engineering, Intelligent

(56) References Cited

OTHER PUBLICATIONS

Agents, and Virtual Reality," vol. 1 of the Proceedings of HCI (Human-Computer Interaction) International 2001, pp. 838-884.*
Meyer, Karl; Final Office Action for U.S. Appl. No. 14/460,786, filed Aug. 15, 2014, dated Sep. 7, 2016; 9 pgs.
Meyer, Karl; Canadian Office Action for serial No. 2,723,506, filed Dec. 3, 2010, dated Dec. 30, 2016, 8 pgs.
Meyer, Karl; Advisory Action for U.S. Appl. No. 14/460,786, filed Aug. 15, 2014, dated Feb. 26, 2016, 2 pgs.
Meyer, Karl; Non-Final Office Action for U.S. Appl. No. 14/460,786, filed Aug. 15, 2014, dated Mar. 23, 2016, 11 pgs.
Meyer, Karl; Canadian Office Action for serial No. 2,723,506, filed Dec. 3, 2010, dated Jan. 14, 2016, 7 pgs.
Meyer, Karl, US Patent Application Entitled: Service Call-Ahead System and Method, having U.S. Appl. No. 12/959,900, filed Dec. 3, 2010; 70 pgs.
Meyer, Karl; Advisory Action for U.S. Appl. No. 12/722,474, filed Mar. 11, 2010, dated Aug. 20, 2012; 3 pgs.
Meyer, Karl; Applicant Initiated Interview Summary for U.S. Appl. No. 12/959,900, filed Dec. 3, 2010, dated May 29, 2012; 3 pgs.
Meyer, Karl; Final Office Action for U.S. Appl. No. 12/959,900, filed Dec. 3, 2010, dated Jun. 12, 2012; 63 pgs.
Meyer, Karl; Final Office Action for U.S. Appl. No. 12/959,900, filed Dec. 3, 2010, dated Nov. 20, 2014, 119 pgs.
Meyer, Karl; Non-Final Office Action for U.S. Appl. No. 12/959,900, filed Dec. 3, 2010, dated Jan. 19, 2012, 62 pgs.
Meyer, Karl; Non-Final Office Action for U.S. Appl. No. 12/959,900, filed Dec. 3, 2010, dated Mar. 6, 2014, 98 pgs.
Meyer, Karl; Non-Final Office Action for U.S. Appl. No. 12/959,900, filed Dec. 3, 2010, dated Jul. 22, 2014, 105 pgs.
Meyer, Karl, U.S. Patent Application Entitled: Service Call-Ahead System and Method, having U.S. Appl. No. 13/246,494, filed Sep. 27, 2011; 67 pgs.
Meyer, Karl; Applicant Initiated Interview summary for U.S. Appl. No. 13/246,494, filed Sep. 27, 2011, dated May 29, 2012; 3 pgs.
Meyer, Karl; Final Office Action for U.S. Appl. No. 13/246,494, filed Sep. 27, 2011, dated Jun. 14, 2012, 108 pgs.
Meyer, Karl; Final Office Action for U.S. Appl. No. 13/246,494, filed Sep. 27, 2011, dated Nov. 20, 2014, 75 pgs.
Meyer, Karl; Non-Final Office Action for U.S. Appl. No. 13/246,494, filed Sep. 27, 2011, dated Jan. 20, 2012, 37 pgs.
Meyer, Karl; Non-Final Office Action for U.S. Appl. No. 13/246,494, filed Sep. 27, 2011, dated Mar. 10, 2014, 66 pgs.
Meyer, Karl; Non-Final Office Action for U.S. Appl. No. 13/246,494, filed Sep. 27, 2011, dated Jul. 22, 2014, 65 pgs.
Meyers, Karl, Advisory Action for U.S. Appl. No. 13/246,494, filed Sep. 27, 2011, dated Aug. 23, 2012; 3 pgs.
Meyer, Karl; First Action Interview Pilot Program Pre-Interview Communication for U.S. Appl. No. 14/460,786, filed Aug. 15, 2014, dated Oct. 6, 2014; 4 pgs.
Meyer, Karl; Non-Final Office Action for U.S. Appl. No. 14/460,786, filed Aug. 15, 2014, dated Nov. 26, 2014, 23 pgs.
Meyer, Karl; U.S. Patent Application entitled: Cascading Call Notification System and Method, U.S. Appl. No. 14/460,786, filed Aug. 15, 2014; 59 pgs.
Meyer, Karl; Canadian Office Action for serial No. 2,723,506, filed Dec. 3, 2010, dated Jul. 9, 2013, 3 pgs.
Web pages from www.cleardestination.com and Internet Archive (web.archive.org) showing availability of some information in 2008; 26 pages.
Meyer, Karl; Final Office Action for U.S. Appl. No. 14/460,786, filed Aug. 15, 2014, dated May 1, 2017, 14 pgs.
Meyer, Karl; Canadian Office Action for serial No. 2,723,506, filed Dec. 3, 2010, dated Feb. 18, 2015, 7 pgs.
Meyer, Karl; Final Office Action for U.S. Appl. No. 14/460,786, filed Aug. 15, 2014, dated Dec. 16, 2015, 7 pgs.
Meyer, Karl; Examiner's Answer to Appeal Brief for U.S. Appl. No. 14/460,786, filed Aug. 15, 2014, dated Feb. 27, 2018, 8 pgs.
Meyer, Karl; Canadian Office Action for serial No. 2,723,506, filed Dec. 3, 2010, dated Dec. 27, 2017, 10 pgs.
Meyer, Karl; Canadian Office Action for serial No. 2,723,506, filed Dec. 3, 2010, dated Nov. 7, 2018, 4 pgs.
Meyer, Karl; Decision on Appeal for U.S. Appl. No. 14/460,786, filed Aug. 15, 2014, dated Jul. 1, 2019, 17 pgs.
Meyer, Karl; Office Action for Canadian patent application No. 2,861,802, filed Sep. 2, 2014, dated Feb. 12, 2021, 7 pgs.
Meyer, Karl; Office Action for Canadian Patent application No. 3,073,908, filed Dec. 3, 2010, dated Apr. 27, 2021, 3 pgs.
Meyer, Karl; Non-Final Office Action for U.S. Appl. No. 16/542,988, filed Aug. 16, 2019, dated Dec. 22, 2021, 10 pgs.
Meyer, Karl; Office Action for Canadian Patent application No. 3,073,908, filed Dec. 3, 2010, dated Jan. 19, 2022, 3 pgs.
Meyer, Karl; Office Action for Canadian patent application No. 2,861,802, filed Sep. 2, 2014, dated Nov. 24, 2021, 7 pgs.
Meyer, Karl; Final Office Action for U.S. Appl. No. 16/542,988, filed Aug. 16, 2019, dated Jun. 8, 2022, 15 pgs.
Meyer, Karl; Non-Final Office Action for U.S. Appl. No. 16/542,988, filed Aug. 16, 2019, dated Sep. 14, 2022, 19 pgs.
Meyer, Karl; Office Action for Canadian patent application No. 2,861,802, filed Sep. 2, 2014, dated Oct. 14, 2022, 4 pgs.
Meyer, Karl; Notice of Allowance for U.S. Appl. No. 16/542,988, filed Aug. 16, 2019, dated Mar. 1, 2023, 11 pgs.
Meyer, Karl; Office Action for Canadian patent application No. 2,861,802, filed Sep. 2, 2014, dated May 5, 2023, 4 pgs.

* cited by examiner

SERVICE CALL-AHEAD SYSTEM AND METHOD

CROSS-REFERENCE TO RELATED APPLICATIONS

This application is a continuation of U.S. patent application Ser. No. 12/959,900, filed Dec. 3, 2010, which claims the benefit of U.S. Provisional Application No. 61/266,599, filed Dec. 4, 2009, the entire disclosures of which are hereby incorporated by reference herein.

This application is related to U.S. Pat. No. 8,515,803, filed Sep. 26, 2011, titled "Triggering and Conducting an Automated Survey," and issued on Aug. 20, 2013, the entire disclosure of which is hereby incorporated by reference herein.

TECHNICAL FIELD

The present disclosure generally relates to service jobs, and more particularly relates to regulating service jobs.

BACKGROUND

Regarding interactions between businesses and customers, a business often may strive to provide reliable, hindrance-free services in order to foster quality customer service. In response to receiving good service, a customer is likely to return for additional business in the future and may also speak highly of the business with others. When businesses are able to satisfy customers with sound service practices, these businesses may be able to create strong relationships with customers built on dependability and quality. As a result, these businesses that provide excellent customer service are usually able to achieve long-term success.

SUMMARY

The present disclosure describes various systems and methods for managing service orders. A service order management system, according to various implementations disclosed herein, comprises a processing device configured to execute logic instructions and a memory device in communication with the processing device. The memory device is configured to store an order management program, which enables the processing device to store an estimated travel time and estimated time of arrival (ETA) in the memory device. The estimated travel time is defined by an estimated period of time for a servicer to travel from a start location to a service destination associated with a customer for whom the servicer is to perform a service job. The ETA is defined by an estimated time of day when the servicer is expected to arrive at the service destination. The order management program also enables the processing device to calculate a call-ahead time defined by a time of day when the customer is to be notified of the ETA of the servicer at the service destination. The calculation of the call-ahead time is based in part on a predetermined advanced-warning time period and the ETA. The predetermined advanced-warning time period is defined by a predetermined amount of time before the ETA for providing an advanced warning of the ETA. The order management program further enables the processing device to automatically notify the customer of the ETA of the servicer at the service destination no earlier than the call-ahead time.

A computer implemented method, according to various implementations, includes storing an estimated travel time and ETA. The estimated travel time may be defined as an estimated period of time for a servicer to travel from a current location to a service destination associated with a customer who is to receive a service from the servicer. The ETA may be defined as an estimated time of day when the servicer is expected to arrive at the service destination. The computer implemented method also includes calculating a call-ahead time defined by a time of day when the customer is to be notified of the servicer's ETA at the service destination. The calculation of the call-ahead time may be based in part on a predetermined advanced-warning time period and the ETA. The predetermined advanced-warning time period may be defined as a predetermined amount of time before the ETA for providing an advanced warning of the ETA. The computer implemented method further includes automatically notifying the customer of the servicer's ETA at the service destination no earlier than the call-ahead time.

Another computer implemented method, according to various implementations, comprises receiving a service order from a business. The service order includes information related to a service job to be performed for a customer, the information including at least a telephone number associated with the customer. The computer implemented method also comprises automatically calling the telephone number to obtain confirmation of the service job and enabling a recipient of the telephone call to connect with a live operator if desired.

According to some embodiments, a computer-readable medium encoded with computer-executable instructions comprises logic adapted to receive a service order from a business. The service order includes information related to a service job to be performed for a customer, the information including at least a telephone number associated with the customer. The computer-readable medium further comprises logic adapted to automatically call a telephone number to obtain confirmation of the service job and logic adapted to enable a recipient of the telephone call to connect with a live operator if desired.

An order management program stored on a computer-readable medium is also disclosed herein, wherein the order management program may include a service status receiving module configured to receive information regarding a starting location of a servicer and information regarding a service destination. The order management program may also include an ETA module configured to store information regarding an ETA that the servicer is expected to reach the service destination. The ETA is based in part on an estimated period of time for the servicer to travel from the starting location to the service destination, where the service destination is associated with a customer for whom the servicer is to perform a service job. The order management program may also include an en route call module configured to calculate a call-ahead time defined by a time of day when the customer is to be notified of the ETA. The calculation of the call-ahead time is based in part on a predetermined advanced-warning time period and the ETA. The predetermined advanced-warning time period is defined by a predetermined amount of time before the ETA at a time when an advanced warning of the ETA is to be provided. The en route call module is further configured to automatically notify the customer of the ETA of the servicer at the service destination no earlier than the call-ahead time.

The present disclosure also includes a portable communication device according to various implementations. The portable communication device comprises a processing device configured to execute logical instructions that are stored in memory. The portable communication device also comprises a user interface in communication with the processing device, where the processing device is configured to cause the user interface to display information regarding a plurality of service jobs. The portable communication device further comprises a transceiver device configured to wirelessly communicate with a service order management system that manages service orders for one or more servicers.

A computer implemented method is also disclosed according to various embodiments. The computer implemented method includes receiving a service schedule that includes information about a plurality of service jobs to be performed. Also included in the computer implemented method is the process of enabling a servicer to select a service job from the plurality of service jobs included in the service schedule. A signal is then transmitted to a service order management system to indicate the selected service job.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION

The present disclosure describes systems and methods for managing service orders. Although various implementations of the present disclosure are described with respect to service orders related to the delivery of goods, it should be understood that the present disclosure also may include other types of services without departing from the principles described herein. Other features and advantages will be apparent to one of ordinary skill in the art upon consideration of the general principles described herein, and all such features and advantages are intended to be included in the present disclosure.

Figure 1:
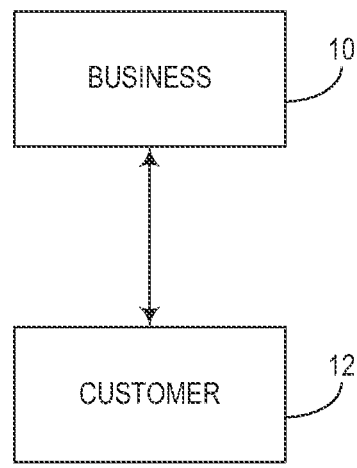
FIG. 1 is a block diagram illustrating a first embodiment of general business interactions.

FIG. 1 is a block diagram of a business interaction between a business 10 and a customer 12. The business 10 may be any company, profit center, or other entity. The business 10 may be a physical store, on-line store, service company, or other entity. The customer 12 may be any individual (or business) who is to receive a service or who orders or purchases a product from business 10. In such an interaction as illustrated in FIG. 1, the business 10 provides goods and/or services directly to the customer 12. During this interaction, there are several opportunities for the business 10 to display customer service. One example is when the customer 12 interacts with a salesperson, sales clerk, or cashier. Another example is when the customer 12 receives a service such as a repair, maintenance, improvement, legal service, or delivery. Additionally, there are several other typical interactions that provide business 10 with opportunities to make a good impression on customer 12. When a service is to be performed in this arrangement, the business 10 employs internal servicers who provide the service directly to the customer 12. Various examples of non-limiting services may include a delivery of a purchased product, a plumbing service, tax return preparation, automobile repair, and the like.

Figure 2:
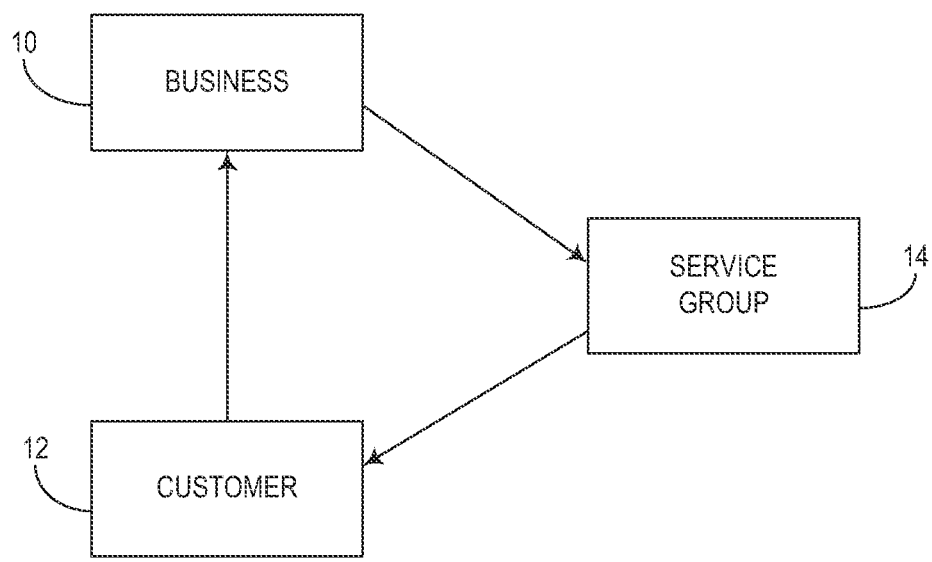
FIG. 2 is a block diagram illustrating a second embodiment of general business interactions.

FIG. 2 shows another example of a general business interaction in which the customer 12 pays the business 10 for goods or services, the business 10 provides a service group 14 with information (e.g. a service order) for fulfilling the service, and the service group 14 provides the service to the customer 12 on behalf of the business 10. The service group 14 includes the service professionals and other people involved in the business of offering one or more services and is often a separate entity from the business 10. For example, the service group 14 may be responsible for delivering, building, assembling, installing, maintaining, repairing, improving, testing, demonstrating, removing, and/or other service actions. In the arrangement of FIG. 2, the business 10 may be considered a client of the service group 14.

According to various implementations, the customer 12 may provide the business 10 with personal information, such as name, address, phone numbers, e-mail addresses, etc., which can be used for contacting the customer 12, for instance, to confirm and/or provide the intended services to be provided in accordance with a service order. In some cases, the personal information may include a phone number that is not the number of a service location. For example, the phone number provided in a service order may be a specific number that the customer wants as the primary contact number for the intended service. For example, the primary contact number in one embodiment may be a work number, cell phone number, relative's number, neighbor's number, landlord's number, building manager's number, or the number of any person who may allow access to the service location on the customer's behalf. Other ordering information may be exchanged or created, including special instructions for delivery, unpacking or assembly requests, and/or installation requests. Orders can usually be taken in any number of ways, including transactions in person, by phone, by mail, by e-mail, by the Internet, or by other ordering methods. The business 10 may provide a service order containing some of this order information to the service group 14 so that the service group 14 can perform the service properly. The service order containing the order information may be provided by an automatic ordering system, by facsimile device, by e-mail, by phone, or in any other manner. The service group 14 may pick up products, as necessary, from the business's store, warehouse, supplier, etc., and deliver the products to one or more customers 12. In accordance with some embodiments, the customer 12 may provide additional service instructions directly to the service group 14.

Figure 3:
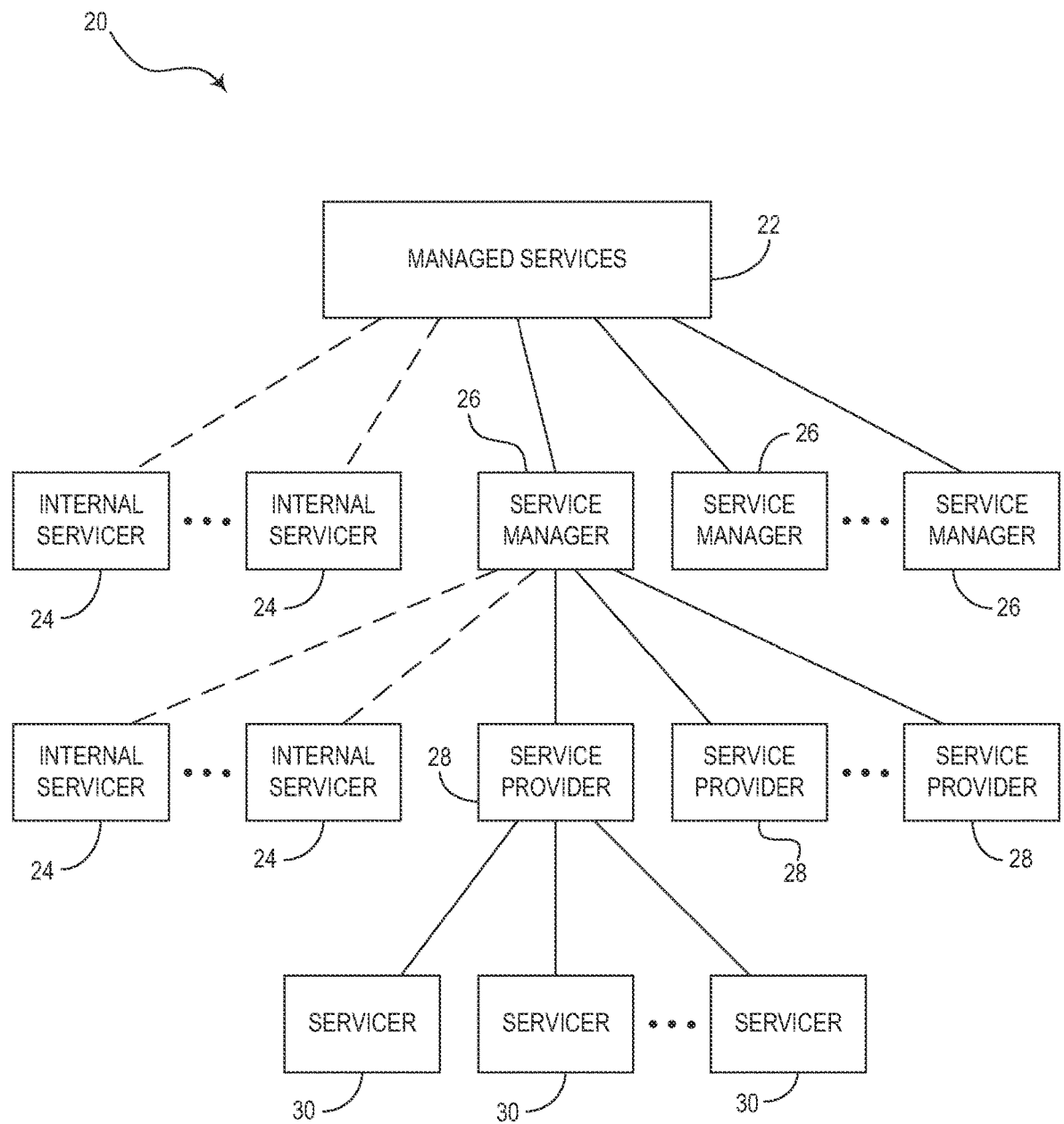
FIG. 3 is a block diagram illustrating an embodiment of a service group according to various implementations of the present disclosure.

FIG. 3 is a block diagram showing an embodiment of a service group 20, such as the service group 14 shown in FIG. 2. In this implementation, managed services 22 may represent a service company, which may be responsible for the management of internal servicers 24, who are employed by a client business, and service managers 26, who may be employed by the managed services 22 company or may be independent contract companies. In some cases, the managed services 22 may include operators who manage the services for a particular client. In other implementations, servicers 30 may be direct independent contractors to managed services 22. According to various implementations of the present disclosure, the managed services 22 may include a service order management system, which may be configured to manage service orders and provide automatic confirmation and call-ahead notifications to customers of upcoming services to be performed. More details of the service order management systems are described below.

The service managers 26 may be field managers, regional managers, or local managers who manage one or more service providers 28, often in a particular region and/or for a specific client. The service managers 26 may also manage one or more internal servicers 24. The service providers 28 manage a number of servicers 30, who may be employed by the service providers 28 or may be independent contractors. The servicer 30 may be the individual or team representing the service group 20 (or service group 14 shown in FIG. 2) and who may interact directly with the customer 12.

Figure 4:
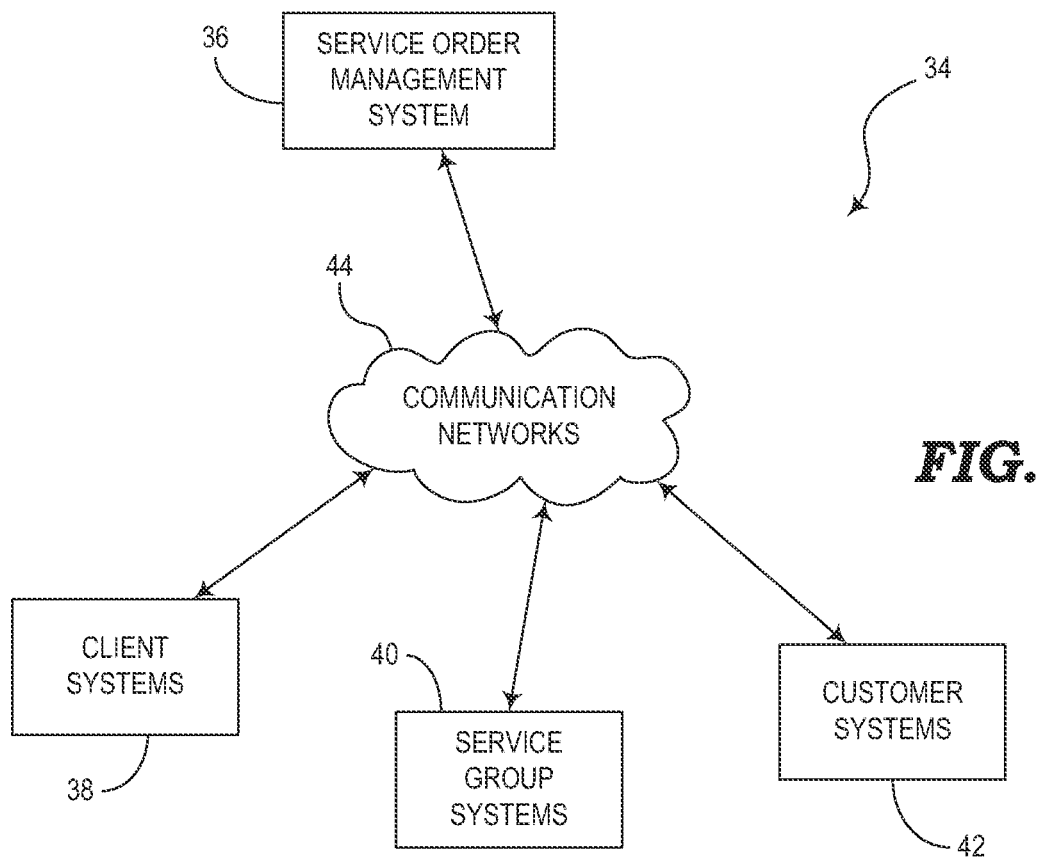
FIG. 4 is a block diagram illustrating a service network system according to various implementations of the present disclosure.

FIG. 4 is a block diagram of an embodiment of a service network system 34 according to various implementations of the present disclosure. The service network system 34 includes a service order management system 36 (described in more detail below), client systems 38, service group systems 40, and customer systems 42. These and other systems are capable of interacting and communicating via one or more communication networks 44. The communication networks 44 may include telephone lines, such as land line or public switched telephone network (PSTN) systems, mobile phone channels and systems, communication channels for exchanging data and information, such as a local area network (LAN), wide area network (WAN), the Internet, or other data, communication, and/or telecommunication networks.

The client systems 38 may represent any business, such as the business 10 described with respect to FIGS. 1 and 2. In the environment of the service network system 34 of FIG. 4, the client systems 38 represent at least a part of a business that is a client of the service group, which utilizes the service group systems 40. The service group may be responsible for performing one or more services on behalf of the clients. The service group may be the service group 20 described with respect to FIG. 3 or other group of servicers, service providers, service managers, and/or managed services. In some embodiments, the service order management system 36 may be part of the client systems 38 or may be part of the service group systems 40. As suggested in FIG. 1, the client systems 38 and service group systems 40 may be part of one company or enterprise.

According to various embodiments of FIG. 4, the service group systems 40 may include equipment used by the servicers and by field managers. For example, the service group systems 40 may include handheld devices (e.g., devices carried by the servicers), mobile phones, laptop computers, or other devices. When the servicer completes a service, the servicer may use any communication device within the service group systems 40 to notify the service order management system 36 that the service has been completed. For example, the servicer may call into an integrated voice response (IVR) device (or voice response unit (VRU)) of the service order management system 36, which may prompt the servicer to input information about the service or completion of the service. Another example may include a telephone call (e.g., landline or mobile call) to a support agent, who may be associated with the service order management system 36 and who may manually enter the service information into the service order management system 36. In some implementations, completion of the particular service may be communicated by some automated process, such as the automatic detection of a change in the servicer's location using, for example, a global positioning system (GPS) device.

Figure 5:
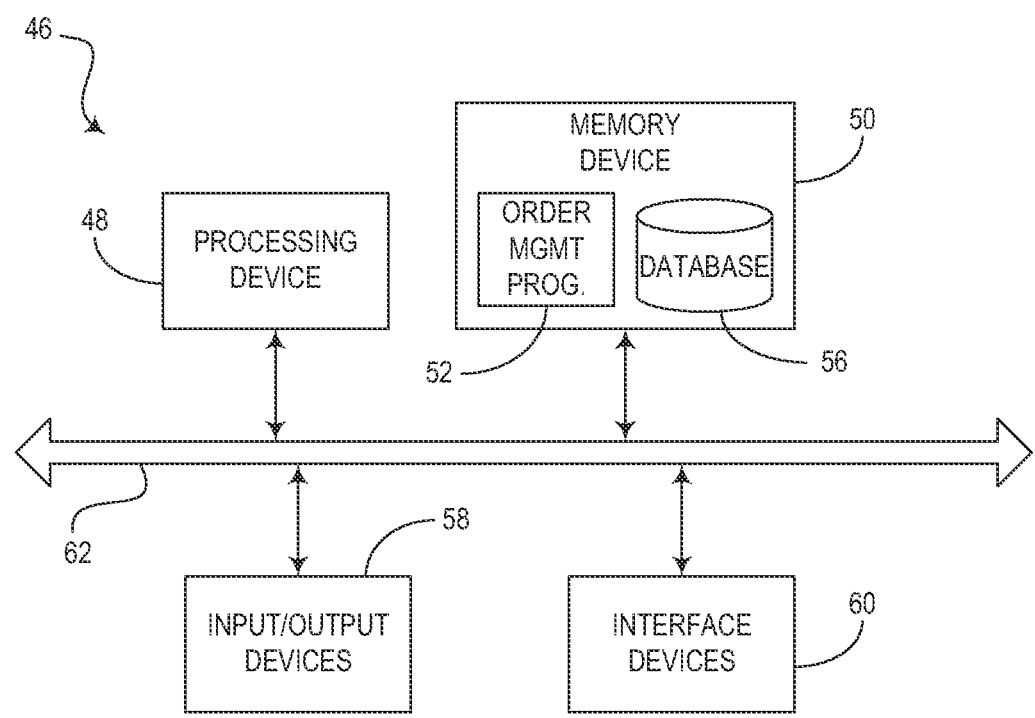
FIG. 5 is a block diagram illustrating an embodiment of the service order processing system, according to various implementations of the present disclosure.

FIG. 5 is a block diagram illustrating an embodiment of a service order processing system 46, according to various implementations of the present disclosure. The service order processing system 46 may represent one or more of the service order management system 36 shown in FIG. 4, a portion or all of the service group systems 40 shown in FIG. 4, a handheld servicer device, and/or other systems or devices associated with communicating information among a network associated with a service group. In some embodiments, the components of the service order processing system 46 may reside on multiple systems and/or may include complementary hardware and/or software.

As shown in the embodiment of FIG. 5, the service order processing system 46 includes a processing device 48 and a memory device 50, which may include an order management program 52 and a database 56. The service order processing system 46 further includes input/output devices 58 and interface devices 60. The components of the service order processing system 46 are interconnected and may communicate with each other via a computer bus interface 62 or by other communication devices.

In some embodiments, each component of the service order processing system 46 as shown may include multiple components on multiple computer systems of a network. For example, the managed services 22 of the service group may comprise computer servers, such as application servers, file servers, database servers, web servers, etc., for performing various functions described herein. The computer servers of the service order processing system 46 may for example be physically separate computer servers or servers in a VMware ESXi 4.0 virtual environment, among other implementations. In addition, the internal servicers 24, service managers 26, service providers 28, and/or servicers 30 may utilize laptop or desktop computer systems, which may form part of the service order processing system 46 and may be used for accessing the computer servers as needed.

The processing device 48 may be one or more general-purpose or specific-purpose processors or microcontrollers for controlling the operations and functions of the service order processing system 46. In some implementations, the processing device 48 may include a plurality of processors, computers, servers, or other processing elements for performing different functions within the service order processing system 46.

The memory device 50 may include one or more internally fixed storage units, removable storage units, and/or remotely accessible storage units, each including a tangible storage medium. The various storage units may include any combination of volatile memory and non-volatile memory. For example, volatile memory may comprise random access memory (RAM), dynamic RAM (DRAM), etc. Non-volatile memory may comprise read only memory (ROM), electrically erasable programmable ROM (EEPROM), flash memory, etc. The storage units may be configured to store any combination of information, data, instructions, software code, etc. The order management program 52 and database 56 may be stored in one or more memory devices 50 and run on the same or different computer systems and/or servers.

The input/output devices 58 may include various input mechanisms and output mechanisms. For example, input mechanisms may include various data entry devices, such as keyboards, keypads, buttons, switches, touch pads, touch screens, cursor control devices, computer mice, stylus-receptive components, voice-activated mechanisms, microphones, cameras, infrared sensors, or other data entry devices. Output mechanisms may include various data output devices, such as computer monitors, display screens, touch screens, audio output devices, speakers, alarms, notification devices, lights, light emitting diodes, liquid crystal displays, printers, or other data output devices. The input/output devices 58 may also include interaction devices configured to receive input and provide output, such as dongles, touch screen devices, and other input/output devices, to enable input and/or output communication.

The interface devices 60 may include various devices for interfacing the service order processing system 46 with one or more other service order processing systems 46 of the service network system 34 via any type of communication system, such as the communication networks 44. The interface devices 60 may include devices for communicating with the client systems 38 and customer systems 42. The interface devices 60 may include a telephone/voice interface device for controlling an IVR device and accessing a telephone network. Also, interface devices 60 may include various devices for interfacing with a data network, such as the Internet, to enable the communication of data. In some examples, the interface devices 60 may include Dialogic cards, Dialogic Diva softiP software, Envox, a voice over Internet protocol (VoIP) device, or other hardware or software interface elements.

The order management program 52 stored in the memory device 50 includes any suitable instructions for processing a customer's service order. For example, the order management program 52 may be configured as Dispatch Office or other software for managing service orders. In some implementations, the order management program 52 may include the capability of tracking deliveries. The order management program 52 in some embodiments may be placed in a separate processing system. As described in more detail below, the order management program 52 is able to receive service orders and create a routing schedule to efficiently provide services to customers at a number of different locations. The order management program 52 may also include a feature for automatically calling the customers to confirm service order information and to notify the customer of the estimated time of arrival (ETA) of a servicer. Additionally, the order management program 52 may be configured to record information related to the services being performed and may receive and/or calculate the ETA when a servicer is expected to arrive at the next service destination.

The order management program 52 of the present disclosure may be implemented in hardware, software, firmware, or any combinations thereof. In accordance with one embodiment, the order management program 52 may be implemented in software or firmware that is stored on a memory device (e.g., memory device 50) and that is executable by an instruction execution system (e.g., processing device 48). The order management program 52 may be implemented as one or more computer programs stored on different memory devices or different computer systems of a network. If implemented in hardware, the order management program 52 may be implemented using discrete logic circuitry, an application specific integrated circuit (ASIC), a programmable gate array (PGA), a field programmable gate array (FPGA), or any combinations thereof.

Figure 6:
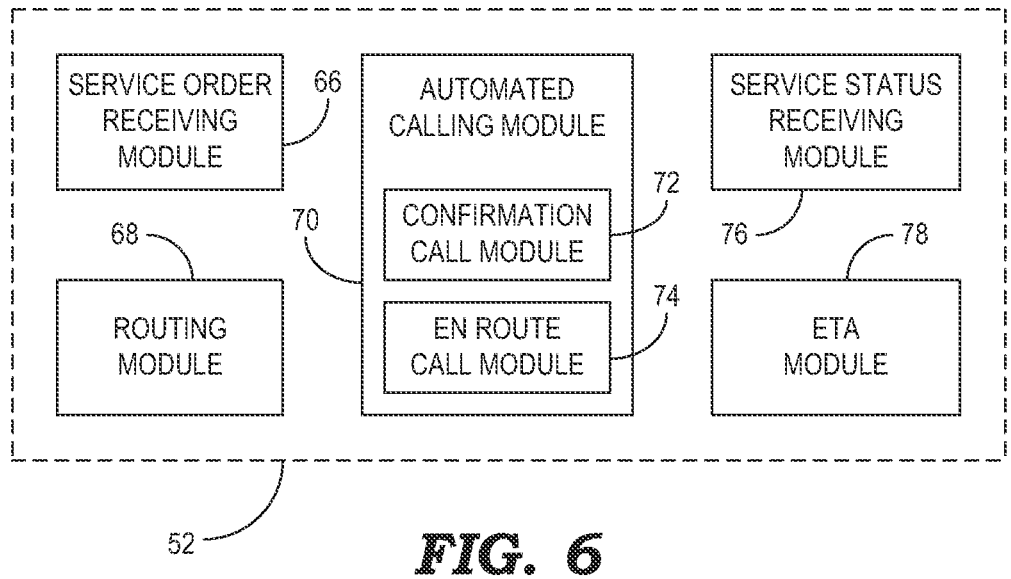
FIG. 6 is a block diagram illustrating an embodiment of the order management program shown in FIG. 5, according to various implementations of the present disclosure.

FIG. 6 is a block diagram showing an embodiment of the order management program 52 shown in FIG. 5. As illustrated in this embodiment, the order management program 52 comprises a service order receiving module 66, a routing module 68, and an automated calling module 70. The automated calling module 70 may include, among other things, a confirmation call module 72 and an en route call module 74. The order management program 52, as illustrated, also includes a service status receiving module 76 and an ETA module 78.

The service order receiving module 66 may be configured to receive service orders from a sales department or from another business (in a client/service group arrangement). The service orders may be received electronically via e-mail, web-based applications, electronic data interchange (EDI), or other electronic communication tools, received via facsimile, phone, etc. and entered by a data entry person, or received by other means. The received service orders may be stored, for example, in the memory device 50 shown in FIG. 5. Among other things, the service orders may include contact information of a customer intended to receive a service. The contact information may include an address (e.g., a service destination), telephone numbers, mobile phone numbers, e-mail addresses, and other information.

The routing module 68 may retrieve all the service orders to be fulfilled in a particular service day (e.g., the next calendar day or next business day) from the service orders received by the service order receiving module 66. The routing module 68 may use up-to-date road map information, travel time estimation software, service performance times representing a typical amount of time required to perform each specific service, and/or other factors for determining efficient routes for one or more servicers who are capable and/or qualified to perform the services. Records of the availability and qualifications of multiple servicers may also be kept to help optimize the service schedules. These and other factors may be considered in the calculations by the routing module 68 to determine efficient routes, service areas, servicers, service schedules, and other related routing information. Ultimately, the routing module 68 may provide a plurality of service schedules, where each service schedule is given to a servicer or service team to perform a number of service jobs in a particular service day.

The automated calling module 70 may be configured as or associated with an IVR device. The automated calling module 70 may include an automatic dialer or other automated telephone device configured to automatically place telephone calls to the customers. In some embodiments, the automated calling module 70 may include logic for suspending calls that are being made to telephone numbers on a "do not call" list. When an automated call is made to the customer, the automated calling module 70 may play a predetermined script and include relevant service order information, such as the items being delivered, the services to be performed, the servicer's ETA, or other information.

The confirmation call module 72 and/or en route call module 74 may be configured to offer several options to the customer in response to the indication of the scheduled service order fulfillment information. For example, the respective call module of the automated calling module 70 may allow the customer to confirm that the customer is available to receive the scheduled service. The customer may be given an option to re-schedule the service, if necessary, using voice and/or keypad entries. Also, the customer may be given an option to transfer the call from the IVR to a live operator. In some embodiments, the customer may also be given an option to opt out of the service altogether. According to some implementations, the confirmation call module 72 and/or en route call module 74 may prompt the customer to enter his or her choices by speaking into the headset (when voice recognition software is being utilized) and/or by pressing numbers on the customer's telephone keypad.

In accordance with one embodiment of the automated calling module 70, the confirmation call module 72 may be configured to place a call to the customer several hours or days before the scheduled service time. For example, the call may be placed the evening before the scheduled service day. The purpose of this conformation call may be to inform the call's recipient of a large service time window (e.g., a three hour window from 1:00 P.M to 4:00 P.M.) during which the service is likely to take place. This allows the customer to make arrangements to provide adequate access to the servicer's destination when the servicer arrives. In some embodiments, the customer may be given an option to connect to a live operator if desired. This feature may allow the customer to receive additional information about the service order, change the service time, or other actions that may require a live operator.

In accordance with some embodiments, a second call may be made using the en route call module 74. The en route call module 74 may be configured to call the customer at a "call-ahead time," which may be defined as a calculated time of day before the servicer's ETA at a particular service destination. The call-ahead time may be based on the ETA and a predetermined advanced-warning time period. For example, in one embodiment, the predetermined advanced-warning time period may be set at 60 minutes. If the ETA is calculated to be 3:30 p.m., the en route call module 74 may be configured to automatically place the second call at 2:30 p.m. (i.e., the second call time or call-ahead time equals the ETA minus the predetermined advanced-warning time period). In accordance with one embodiment, the predetermined advanced-warning time period is determined by the system and applied to all service orders in the same manner.

This second call may be more accurate because it is based on real-time conditions and is based on the ETA received and/or calculated by the ETA module 78 and any additional information input by the servicer in the field. In some embodiments, the servicer may simply enter the ETA based on the servicer's knowledge of particular routes, traffic conditions, and/or other factors. For example, if the servicer is delayed based on unforeseen events earlier in the service day, the ETA module 78 provides an ETA that is an accurate time estimate, and the en route call module 74 may notify the customer of the more accurate time estimate. Further, the ETA may be communicated to the customer, or other recipient specified in the service order, as a range of times. For example, the ETA for the servicer to arrive at the applicable destination may be between 3:20 p.m. and 3:40 p.m.

The service status receiving module 76 may be configured to receive information from the servicers regarding the status of the services performed by each servicer. Also, the service status receiving module 76 may receive information regarding the current location of the servicers and the servicers' next destinations. In one embodiment, the service status receiving module 76 may receive information related to the starting locations of the servicers and may record various service destinations and arrival times throughout the service day. In some embodiments, these records may be used to adjust the processes used by the routing module 68. Also, this information may be used to determine or refine travel times from various starting locations to the various service destinations.

In accordance with one embodiment, the ETA module 78 may be configured to utilize similar algorithms used by the routing module 68 to calculate the servicer's estimated travel time between two points (e.g., from one service destination or starting location to a next service destination). The ETA module 78 may be configured to calculate the time of day that the servicer may be expected to reach the next service destination based on the servicer's starting location, the time when the servicer is leaving the starting location or previous service destination, the estimated travel time based at least on map routing characteristics, and other factors. In one embodiment, the ETA module 78 calculates the ETA upon receipt of the selected next service destination from the servicer. The servicer may send his/her choice of the next destination to the ETA module 78 in a number of ways including utilizing, for example, a handheld device, mobile phone, telephone, portable facsimile machine, or other communication device. In some embodiments, the servicer may communicate with an agent who is associated with the service group and is able to enter the applicable information into the system.

In some cases, the servicer may request an extra time period be added to the ETA, such as to fill up the servicer's vehicle with gasoline, to stop for lunch, to take a break, to account for traffic, to account for road and/or weather conditions, or other factors that may not be anticipated by the ETA module 78. In this case, the ETA module 78 may use the requests for extra time to adjust the ETA calculations. For example, if the ETA module 78 provides an initial ETA of 3:00 p.m., the servicer may request an additional time period of fifteen minutes in order to take a break. The ETA module 78 may add this requested time period to the ETA for an updated ETA of 3:15 p.m.

In accordance with another embodiment, the ETA module 78 may receive the ETA from the servicer. Based on the servicer's experience, familiarity with the route or destination, and other factors, the servicer may be able to estimate the time of arrival better than traditional software programs. In this embodiment, the ETA module may receive the ETA from the servicer, store the ETA in memory and communicate the ETA to the customer at the call-ahead time.

Referring again to FIG. 4, communication between the servicer and the service order management system 36 may be enabled in a number of ways. For example, the servicers may carry a handheld device that is configured to display a service schedule for the servicer's shift and may include the names and addresses of customers to whom the services are performed. The handheld devices may also be configured to enable the servicer to indicate the arrival at a pick-up location, departure from the pick-up location, arrival at a service location, departure from the service location, and the intended next service destination. The servicer may be enabled to select the order of destinations and indicate an extra time period needed to reach the next destination. In some embodiments, the handheld device may also be configured to list items to be picked up and remove the items from the list as they are loaded in the servicer's vehicle. Further, the handheld device may include a scanner to scan items as they are being picked up or delivered, to thereby track the items. Various implementations of the handheld devices are described in more detail below.

However, according to embodiments of the service order management system 36, the servicer may communicate with the service order management system 36 without the use of a handheld device. For example, the servicer may carry a copy of the service schedule, which may include, for example, the names and addresses of the customers, service order numbers, expected service times or other information. The servicer may also carry route sheets, manifests, directions between service destinations and other useful paperwork. Without a handheld device, the servicer may use a mobile phone to communicate with an IVR system associated with the service order management system 36. The IVR system may be configured to prompt the servicer through a number of selections and menus to track the servicer's location or progress and/or to enable communication of other information. In this respect, the service order management system 36 may be configured to enable the servicer to select options over a mobile phone or land line phone to indicate the completion of the service jobs, indicate the next destination or service order number of the next destination, or enter an ETA to reach the next destination.

In some embodiments, the ETA module 78 (FIG. 6) may present a calculated ETA to the servicer and may allow the servicer to edit or accept the calculated ETA. Edits to the ETA may be made based in part on real time conditions, such as current traffic conditions, weather conditions, or other conditions. The modified ETA can be communicated back to the service order management system 36 by any communication means. The service order management system 36 may then adjust any applicable call-ahead times accordingly. It should also be noted that the automated calling module 70 may be configured to place one call at a time. Therefore, if the calculated call-ahead times for different servicers travelling to different customers happens to be the same, the automated calling module 70 may prioritize the calls to allow one call to be made before another. This sequence of calls may be created using any combination of prioritizing algorithms.

Figure 7:
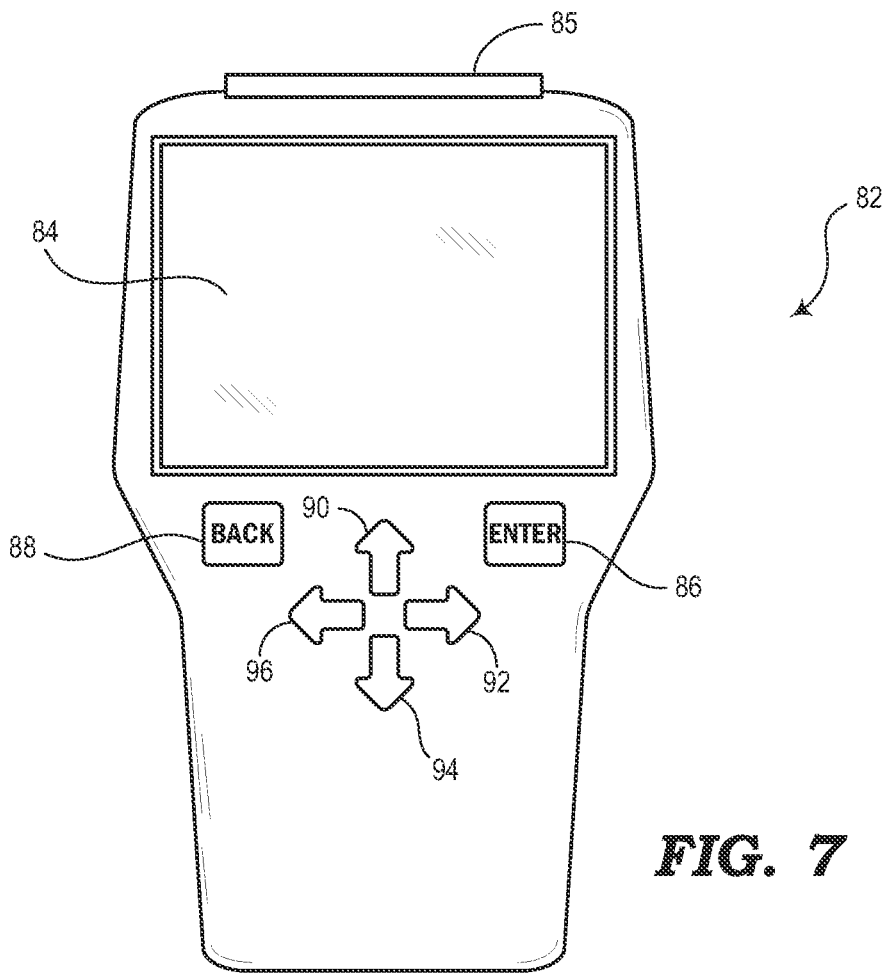
FIG. 7 is a diagram illustrating an embodiment of a servicer device according to various implementations of the present disclosure.

FIG. 7 is a diagram illustrating an embodiment of a servicer device 82. As mentioned above, the servicer device 82 or other similarly functioning handheld device may be optional in the service network system 34. As illustrated in this embodiment, the servicer device 82 comprises a display screen 84, a scanner 85, an enter button 86, a back button 88, an up button 90, a right button 92, a down button 94, and a left button 96. In some embodiments, the right button 92 and left button 96 may be omitted. According to various implementations, fewer or more buttons or input devices may be included.

The display screen 84 may be configured to display user interfaces, as described in more detail below, to display user prompts, instructions, schedule information, and/or driving direction. The scanner 85 may be configured to scan bar codes placed on items to be delivered. Using the scanner 85, the servicer device 82 is able to identify items that are to be loaded on the servicer's vehicle or unloaded from the servicer's vehicle. The scanner 85 can also be used to scan items that may have been damaged and are not to be delivered to the customer. According to some implementations, the service network system 34 may operate without the use of some or all of the handheld servicer devices (e.g., servicer device 82). Instead, each respective servicer may be allowed to communicate with the service order management system 36 using a mobile phone, smart phone, land line phone, personal digital assistant (PDA), or by other communication devices.

Figure 8:
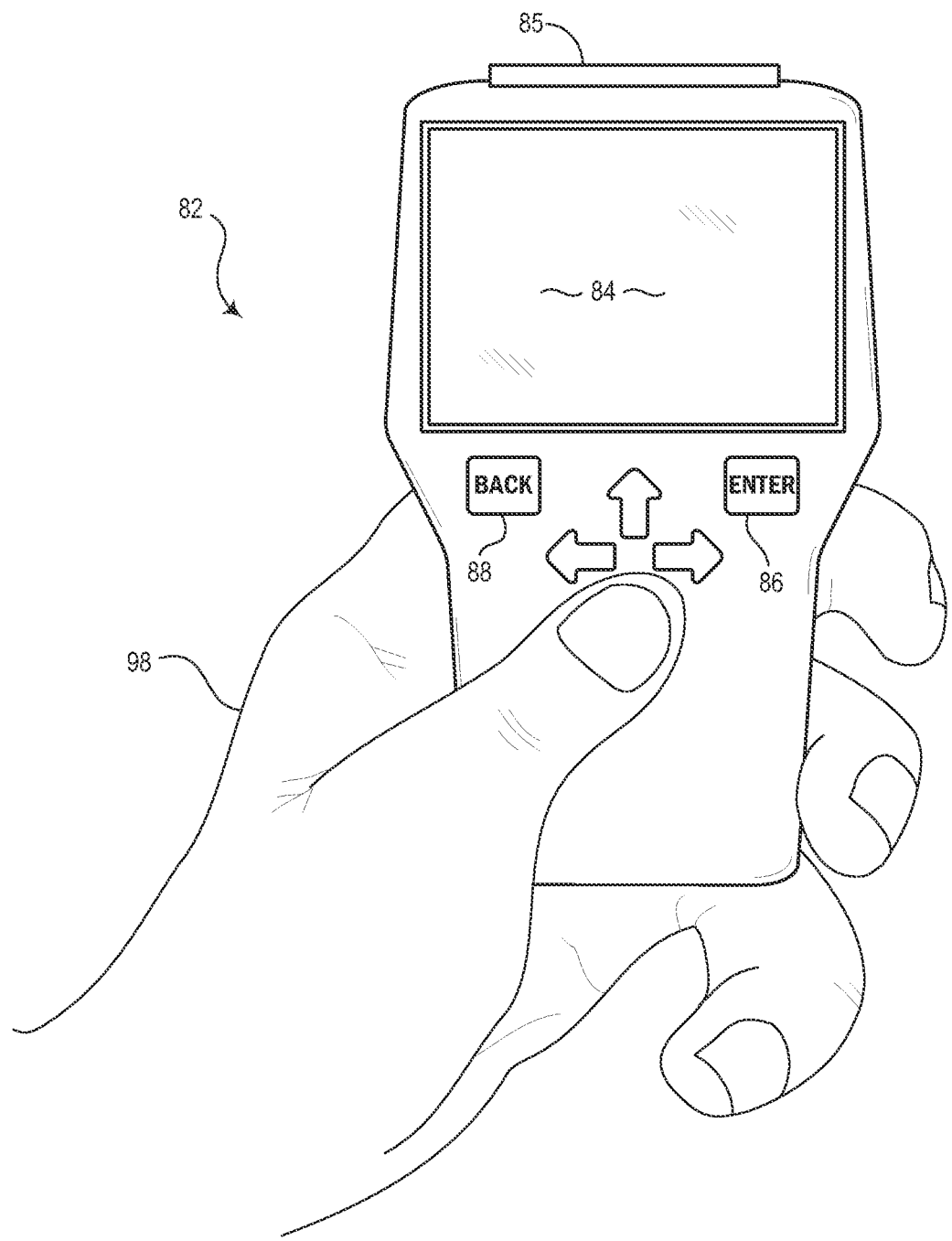
FIG. 8 is a diagram illustrating the servicer device of FIG. 7 in use, according to various implementations.

FIG. 8 is a diagram showing an embodiment of the servicer device 82 of FIG. 7 in use by a servicer 98, such as a servicer who performs a particular service, an assistant to the servicer, a service team member, a driver of a service vehicle, or other user. As illustrated in this embodiment, the servicer device 82 is a portable handheld device that may be operated using one hand of the servicer 98. Other designs of the servicer device 82 may be considered for enabling the user to easily view the display screen 84, navigate using the direction buttons, and provide input by pressing the enter button 86 and back button 88. Regarding the implementations in which the servicer device 82 is used in the service network system 34, the service device 82 may be configured to provide various user interfaces to communicate information to the servicer and to receive information from the servicer. Any user interfaces may be used in this regard. The following examples of user interfaces do not intend to limit the present disclosure to these particular embodiments, but are rather provided for the purposes of illustrating possible information exchanges.

Figure 9:
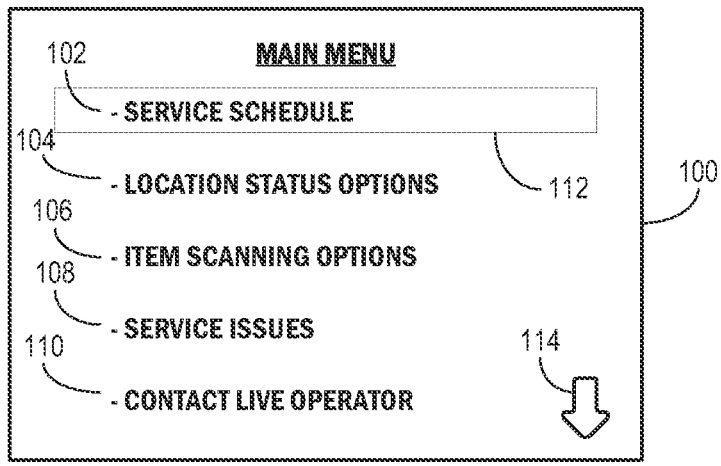
FIG. 9 is a diagram illustrating a user interface of the servicer device of FIG. 7 enabling a user to select from a main menu, according to various implementations of the present disclosure.

FIG. 9 is a diagram illustrating an embodiment of a user interface 100 enabling a servicer to select from a main menu. According to various implementations, the user interface 100 may be associated with servicer-operated equipment, such as, for example, the servicer device 82. The selected items of the user interface 100 include a service schedule field 102, a location status options field 102, an item scanning options field 106, a service issues field 108, and a contact live operator field 110. The user interface 100 may include a selection identifier 112 or other means of identifying which one of the options in the main menu is being selected. The fields 102, 104, 106, 108, and 110 may be considered to be links to additional user interface screens. The servicer is enabled to navigate the selection identifier 112 using any suitable navigation tools, such as the arrow buttons 90, 92, 94, and 96 shown in FIG. 7, the effect of which can be shown by the arrow 114 on the user interface 100. These and other techniques can be realized for providing an input/output interface between menu information (and other information as described below) and the servicer 98.

Figure 10:
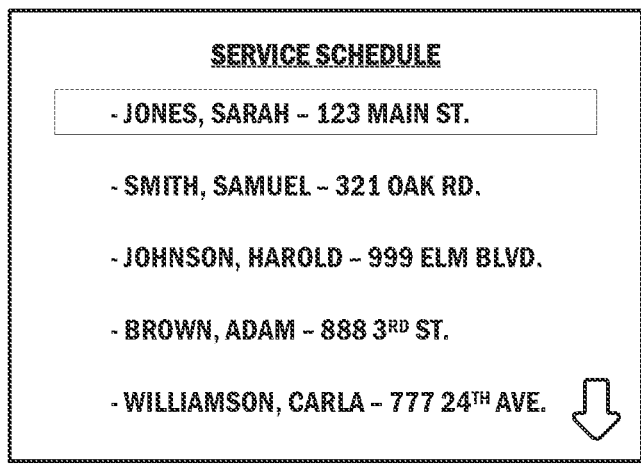
FIG. 10 is a diagram illustrating a user interface of the servicer device of FIG. 7 enabling a servicer to view a service schedule, according to various implementations of the present disclosure.

FIG. 10 is a diagram illustrating an embodiment of a user interface 116 enabling a servicer to view a service schedule. The service schedule shown in the user interface 116 includes information regarding one or more service jobs to be completed during the service day. The information may include the name of the customer receiving the service, the address of the customer, telephone numbers, and/or other information. The service schedule may be listed in an order, including, for example, a sequential schedule determined by the routing module 68 (FIG. 6).

Figure 11:
FIG. 11 is a diagram illustrating a user interface of the servicer device of FIG. 7 enabling a servicer to enter location status options, according to various implementations of the present disclosure.

FIG. 11 is a diagram illustrating an embodiment of a user interface 120 enabling a user to enter location options. In some embodiments, the user interface 120 may be displayed when the location options field 104 is selected in the main menu user interface 100 of FIG. 9. The user interface 120 may include four selections for updating changes in location of the servicer. As illustrated in FIG. 11, the options include a first field 122 for indicating the arrival of the servicer at a loading or pick-up location. A second field 124 indicates the departure of the servicer from the loading or pick-up location. The loading or pick-up area represents one or more locations where items are to be loaded on the servicer's vehicle, such as a delivery van, delivery truck, box truck, flat bed truck or other vehicle. Since the options displayed in fields 122 and 124 are related to locations related to specific pick-up locations for loading items to be delivered, these fields may be omitted for situations where the service provided to the customer does not include delivery services or includes services that do not necessarily require travelling to another location to pick up items associated with the services.

The user interface 120 also includes a field 126 for indicating when the servicer arrives at a service location. The particular service location where the servicer arrives may be known based on the information obtained by processes described in more detail below with respect to other user interfaces. Field 128 may be selected to indicate that the servicer is leaving the particular service location. The indication that the servicer is leaving the location may be interpreted as an indication that the service job has been completed. Regarding embodiments in which the servicer device 82 is not being used to indicate service job completion, the service order management system 36 may allow a servicer to use an IVR system to communicate a completed job. The service order management system 36 may then prompt the servicer to enter the next service job/destination or the service order number of the next service job.

Figure 12A:
FIG. 12A is a diagram illustrating a user interface of the servicer device of FIG. 7 enabling a servicer to select a first service destination, according to various implementations of the present disclosure.

FIG. 12A is a diagram illustrating an embodiment of a user interface 132 enabling a servicer to select a first service destination. The user interface 132 may display the total number of service jobs to be performed for a particular service day for the servicer. Also, the user interface 132 may prompt the servicer to select which will be the first destination. Although the routing module 68 shown in FIG. 6 may be configured to optimize the sequence of customer destinations based on several factors, the servicer may change the order as needed. When one of the destinations is selected, the servicer device 82 may be configured to provide turn by turn directions to the selected destination. According to some embodiments, the user interface 132 may include additional information, which may be presented in any suitable fashion, such as in one or more columns next to the names and addresses. Some additional information, for example, may include a status of the deliveries, such as "open," "scheduled," "completed," or the like. In some embodiments, the user interfaces described below with respect to FIGS. 12B, 12C, and 12D may be displayed.

Figure 12B:
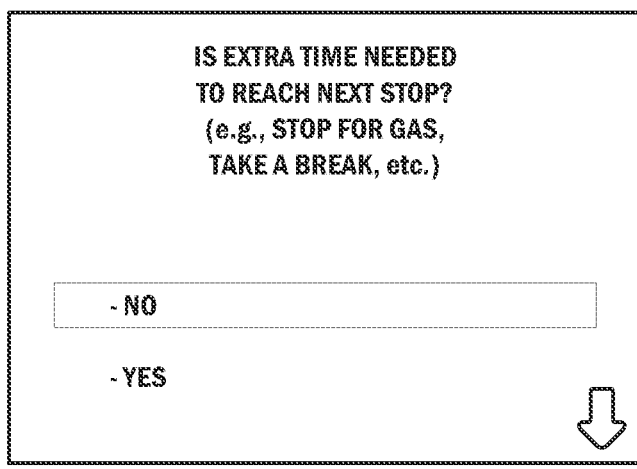
FIG. 12B is a diagram illustrating a user interface of the servicer device of FIG. 7 enabling a servicer to indicate a need for extra time, according to various implementations of the present disclosure.

FIG. 12B is a diagram illustrating an embodiment of a user interface 136 enabling a servicer to indicate a need for a time extension to be added to the ETA. After the first destination has been selected, the servicer device 82 may display the user interface 136 to ask if the servicer needs extra time to reach the first destination. For example, some reasons for needing extra time may include a need to stop for gasoline, a need to take a break, or other reasons. If "yes" is selected, the servicer device 82 prompts the servicer to enter the time period needed as indicated with respect to FIG. 12C.

Figure 12C:
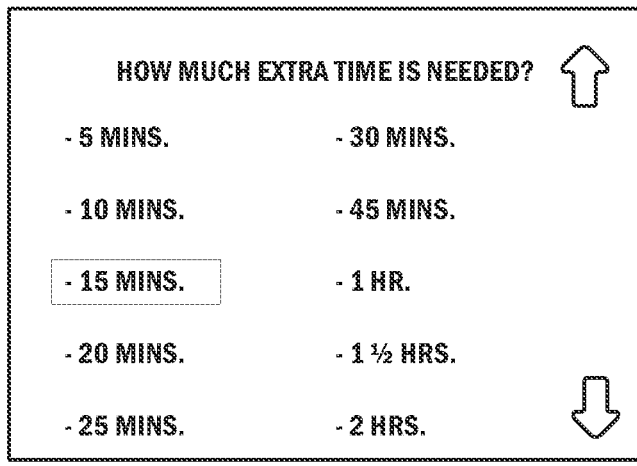
FIG. 12C is a diagram illustrating a user interface of the servicer device of FIG. 7 enabling a servicer to enter an amount of extra time needed, according to various implementations of the present disclosure.

FIG. 12C is a diagram illustrating an embodiment of a user interface 140 enabling a servicer to enter the extra time period needed. The user interface 140 may include selectable amounts, as illustrated, or in other embodiments may include a field enabling the servicer to enter a time extension manually. Other implementations may be used to allow the servicer to enter the amount of extra time needed beyond the normal travel time to reach the next destination.

Figure 12D:
FIG. 12D is a diagram illustrating a user interface of the servicer device of FIG. 7 enabling a servicer to view the scheduled arrival time of a first service destination, according to various implementations of the present disclosure.

FIG. 12D is a diagram illustrating an embodiment of a user interface 144 enabling a servicer to view the scheduled arrival time of a first service destination. After the servicer has entered or accepted the first destination as described with respect to FIG. 12A and entered any extra time period needed to reach that destination, the servicer device 82 may provide a summary of the location and expected arrival time. In accordance with one embodiment, upon the servicer entering or accepting the first or next destination, the en route call module 74 shown in FIG. 6 may be configured to communicate the estimated time of arrival (ETA) of the servicer to the customer based on normal travel time, which may be determined using a GPS-enabled device or other suitable travel algorithms and information, including the extra time period provided by the servicer.

In some embodiments, the servicer device 82 may provide updated information regarding the servicer's progress toward reaching the next destination in order to indicate to the servicer how he or she is doing. For example, the servicer device 82 may indicate when a deadline is near, the time remaining before the scheduled arrival, when the servicer is on schedule, when the servicer is behind schedule, or other alerts. In this respect, the servicer device 82 may provide any visual and/or auditory signals to inform the servicer of the travel progress. The purpose of such communication may be a way of encouraging a servicer to be mindful of deadlines. When the servicer arrives at the scheduled destination, he or she may select the option of "arrived at service location" 126 as shown in the user interface 120 of FIG. 11.

When the service is completed at the first destination, the servicer may select the location status options field 104 from the user interface 100 of FIG. 9 and then select the field 128 (FIG. 11) indicating that the servicer is leaving the service location. At this point, if additional destinations are scheduled, the servicer device 82 repeats the process for the next destination.

Figure 13A:
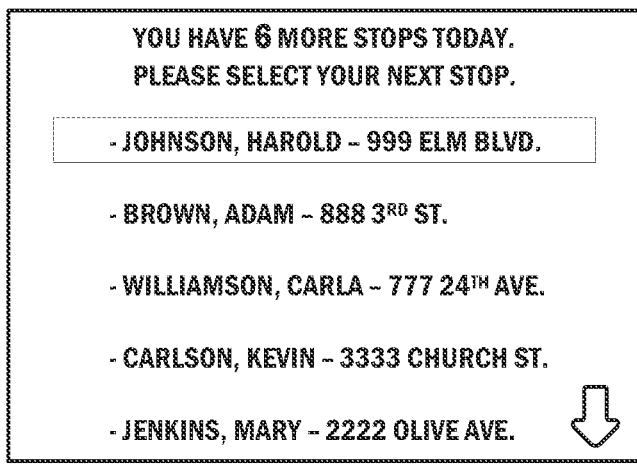
FIG. 13A is a diagram illustrating a user interface of the servicer device of FIG. 7 enabling a servicer to select a next service destination, according to various implementations of the present disclosure.

FIG. 13A is a diagram illustrating an embodiment of a user interface 148 enabling a servicer to select a next service destination, when additional destinations exist. The user interface 148 may be similar to user interface 132 of FIG. 12A and may display the number of remaining service jobs to be performed for the particular service day. Also, the user interface 148 may prompt the servicer to select which destination will be the next destination. The user interface 148 may also display the status of each of the deliveries, such as "opened," "scheduled," "completed," etc. When a destination is selected, the servicer device 82 may be configured to display the user interfaces described below with respect to FIGS. 13B, 13C, and 13D, as appropriate.

Figure 13B:
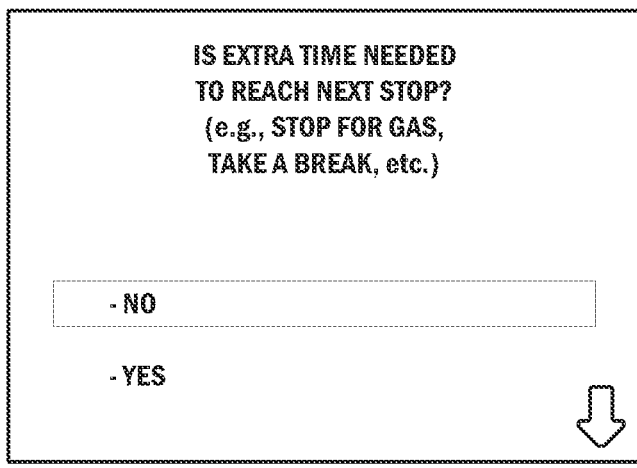
FIG. 13B is a diagram illustrating a user interface of the servicer device of FIG. 7 enabling a servicer to indicate a need for extra time, according to various implementations of the present disclosure.
Figure 13C:
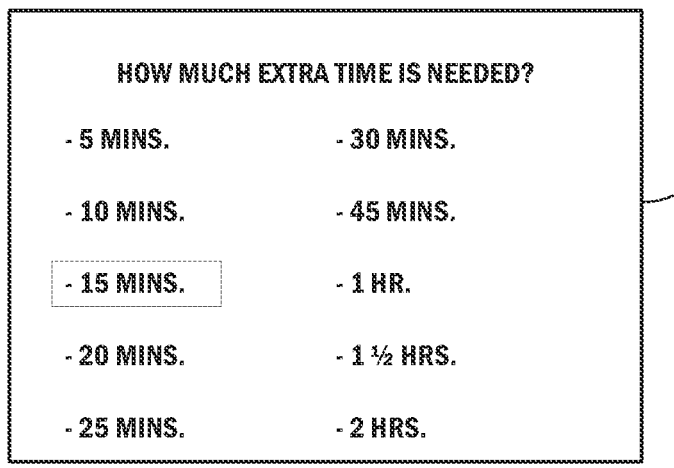
FIG. 13C is a diagram illustrating a user interface of the servicer device of FIG. 7 enabling a servicer to enter an amount of extra time needed, according to various implementations of the present disclosure.

FIG. 13B is a diagram illustrating an embodiment of a user interface 152 enabling a servicer to indicate a need for an extra time period to reach the next destination. After a next destination has been selected with respect to FIG. 13A, the servicer device 82 may display the user interface 152 to ask if the servicer needs extra time to reach the next destination. If "yes" is selected, the servicer device 82 prompts the servicer to enter the time period needed as indicated with respect to FIG. 13C. FIG. 13C is a diagram illustrating an embodiment of a user interface 156 enabling a servicer to enter an amount of extra time needed. As illustrated, the user interface 156 may include selectable amounts. According to various embodiments, the servicer device 82 may enable the servicer to enter the extra time period manually or by any other technique.

Figure 13D:
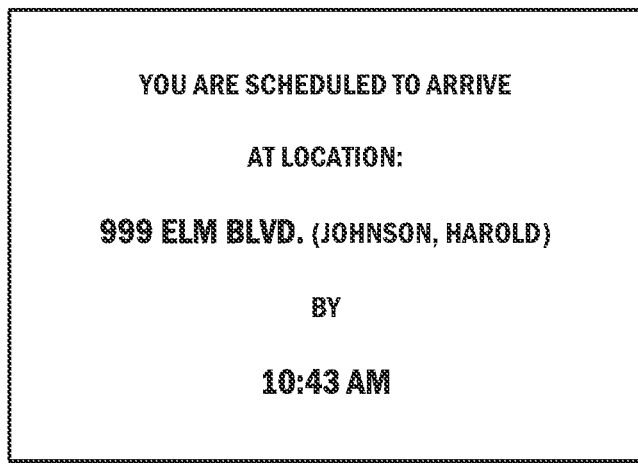
FIG. 13D is a diagram illustrating a user interface of the servicer device of FIG. 7 enabling a servicer to view the scheduled arrival time of a next service destination, according to various implementations of the present disclosure.

FIG. 13D is a diagram illustrating an embodiment of a user interface 160 enabling a servicer to view the scheduled arrival time of a next service destination. After the servicer enters the next destination as described with respect to FIG. 13A and enters the extra time period needed to reach that destination, the servicer device 82 may provide a summary of the location and expected arrival time. In addition, the en route call module 74 shown in FIG. 6 may be configured to communicate the ETA to the customer based on normal travel time and any extra time needed. In one embodiment, this customer communication occurs immediately upon the receipt of the destination and final calculation of the ETA by the ETA module 78 shown in FIG. 6.

When the service is completed at this destination, the servicer may select the location options field 104 from the user interface 100 of FIG. 9 and select the field 128 (FIG. 11) reporting that the servicer is leaving the service location. At this point, if additional destinations are scheduled, the servicer device 82 repeats the process for the next destination or destinations. When service has been provided to the customers at each of the destinations on the schedule, the servicer device 82 may display the user interface described with respect to FIG. 14A.

Figure 14A:
FIG. 14A is a diagram illustrating a user interface of the servicer device of FIG. 7 enabling a servicer to view a completed service schedule, according to various implementations of the present disclosure.

FIG. 14A is a diagram illustrating an embodiment of a user interface 164 enabling a servicer to view a completed service schedule. The user interface 164 may indicate that there are no more service destinations for the particular service day. The user interface 164 may also include a list of all the customers serviced during the day. If a status of each delivery is displayed, the user interface 164 may show that the status of each delivery is "completed."

Figure 14B:
FIG. 14B is a diagram illustrating a user interface of the servicer device of FIG. 7 enabling a servicer to select a post-service action, according to various implementations of the present disclosure.

FIG. 14B is a diagram illustrating an embodiment of a user interface 168 enabling a servicer to select an action when all service jobs have been completed, according to various embodiments. For example, the user interface 168 may display an option to end the program for the current service day and provide that a new schedule may begin on the next service day. Another option may include an ability to print a list of the day's service jobs completed, which may be used for the servicer's records. Further, the user interface 168 may enable the servicer to inquire about additional service jobs for the day. For example, if one servicer is unable to complete one or more services, the responsibility may be transferred to another servicer who might have time to attempt to fulfill the remaining services left by servicer.

Figure 15A:
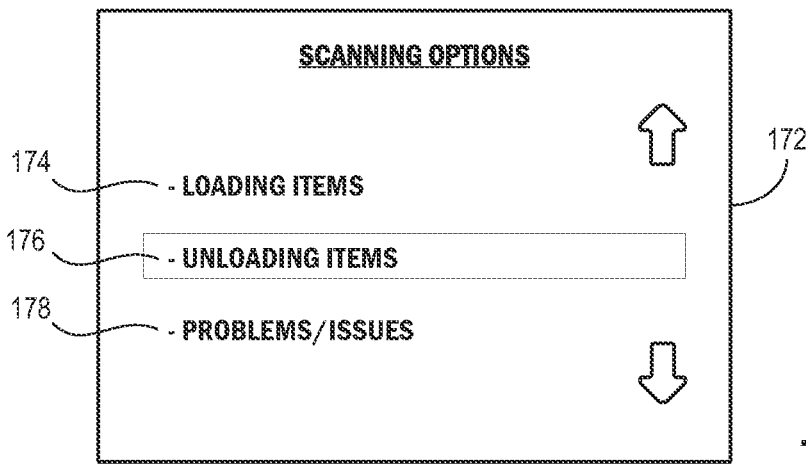
FIG. 15A is a diagram illustrating a user interface of the servicer device of FIG. 7 enabling a servicer to select scanning options, according to various implementations of the present disclosure.

FIG. 15A is a diagram illustrating an embodiment of a user interface 172 enabling a servicer to select scanning options. When the servicer selects the item scanning options field 106 in the main menu user interface 100 of FIG. 9, the servicer device 82 may display the user interface 172. A first option 174 in the user interface 172 is a selectable field for loading items. A second option 176 indicates that the servicer can scan items which are being unloaded from the servicer's vehicle. A third option 178 indicates that one or more problems or issues with a scanned item or items prevent normal service steps. In some embodiments, the servicer device 82 may be configured without the scanner 85 or without the ability to provide item level scanning.

Figure 15B:
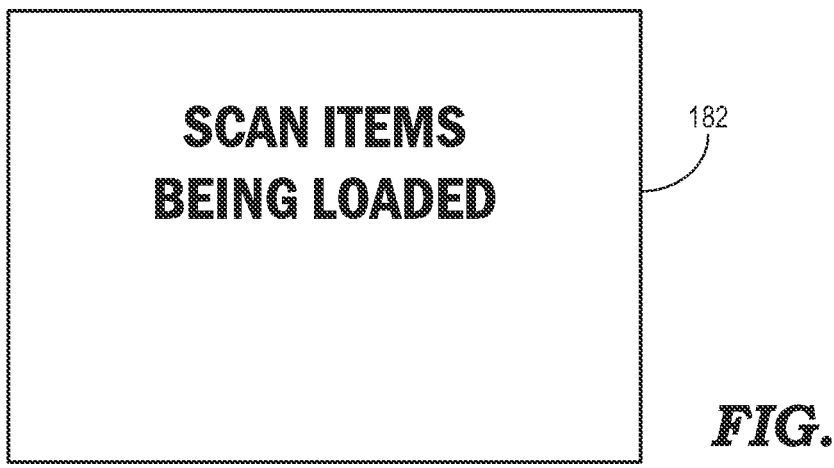
FIG. 15B is a diagram illustrating a user interface of the servicer device of FIG. 7 prompting a servicer to scan an item, according to various implementations of the present disclosure.

FIG. 15B is a diagram illustrating an embodiment of a user interface 182 prompting a servicer to scan an item. When the servicer selects the loading items option 174 of user interface 172 of FIG. 15A, the user interface 182 prompts the servicer to utilize the scanner 85 on the servicer device 82 to scan an item that is to being loaded on the servicer's delivery vehicle. Scanning an item may comprise scanning a bar code attached to or associated with the item to identify the specific item. The user interface 182 may be displayed multiple times depending on the number of items to be loaded.

Figure 15C:
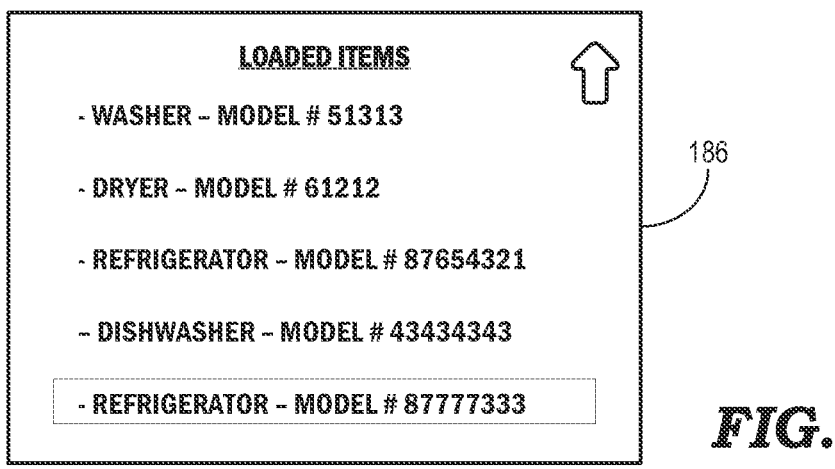
FIG. 15C is a diagram illustrating a user interface of the servicer device of FIG. 7 enabling a servicer to view loaded items, according to various implementations of the present disclosure.

FIG. 15C is a diagram illustrating an embodiment of a user interface 186 enabling a servicer to view the loaded items. When one or more items have been scanned to indicate that the items are being picked up or loaded on the servicer's delivery vehicle, the list of loaded items in user interface 186 is updated. In some embodiments, a list of all the items to be loaded may be associated with a particular servicer and may be displayed on the servicer device 82, whereby the items to be loaded are removed from the list when they are scanned to present only the items that are yet to be loaded.

Figure 15D:
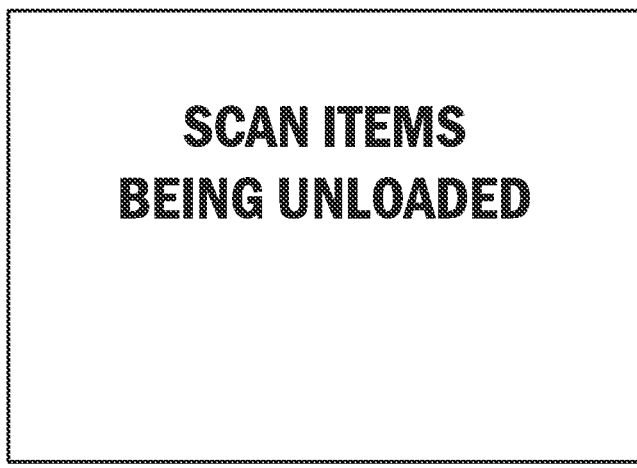
FIG. 15D is a diagram illustrating a user interface of the servicer device of FIG. 7 prompting a servicer to scan an item, according to various implementations of the present disclosure.
Figure 15E:
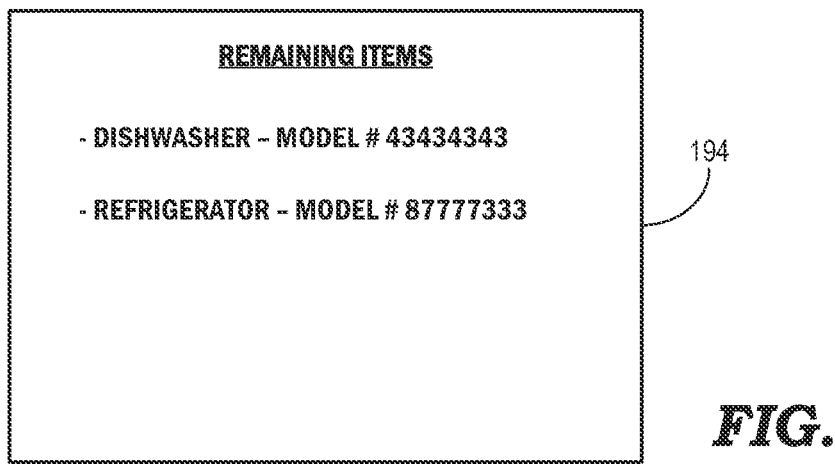
FIG. 15E is a diagram illustrating a user interface of the servicer device of FIG. 7 enabling a servicer to view the remaining items to be unloaded, according to various implementations of the present disclosure.

FIG. 15D is a diagram illustrating an embodiment of a user interface 190 prompting a servicer to scan an item. When the unloading items option 176 is selected in user interface 172, the user interface 190 prompts the servicer to scan the items as they are being unloaded from the service vehicle. FIG. 15E is a diagram illustrating an embodiment of a user interface 194 enabling a servicer to view the remaining items to be unloaded. The user interface 194 may be configured to list the items is any suitable manner to communicate which items are to be unloaded at a particular location or the items which have already been unloaded.

Figure 15F:
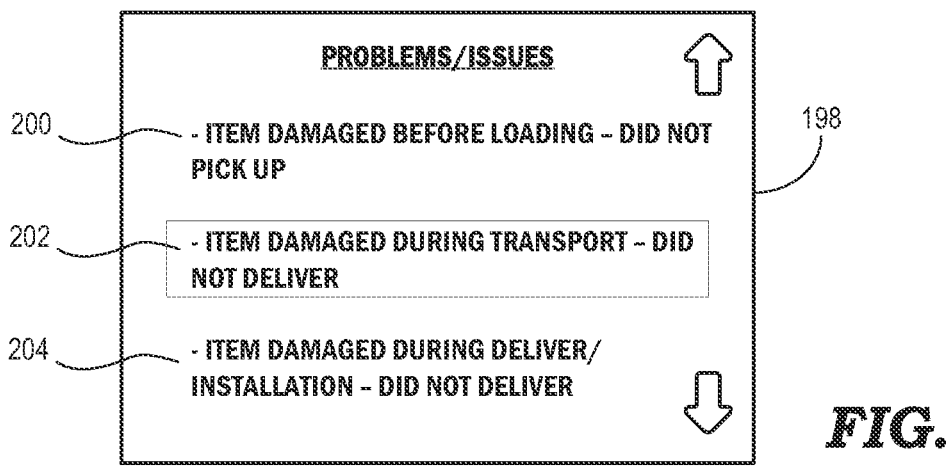
FIG. 15F is a diagram illustrating a user interface of the servicer device of FIG. 7 enabling a servicer to select scanning issues, according to various implementations of the present disclosure.

FIG. 15F is a diagram illustrating an embodiment of a user interface 198 enabling a servicer to select any issues that may apply to an item to be scanned. When the problems/issues option 178 is selected in the user interface 172 of FIG. 15A, the servicer device 82 may display the user interface 198 to allow the servicer to scan items that are not being picked up or delivered because of the item being damaged. A first option 200 allows the servicer to indicate that an item is damaged before loading and is not being picked up. A second option 202 allows the servicer to indicate that an item has been damaged during transport and is not being delivered. A third option 204 allows the servicer to indicate that an item has been damaged during deliver or installation and is not being delivered.

Figure 16:
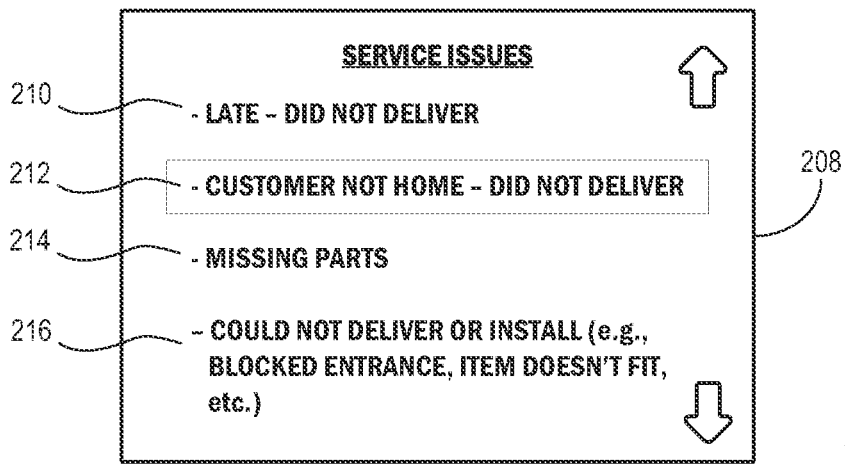
FIG. 16 is a diagram illustrating a user interface of the servicer device of FIG. 7 enabling a servicer to select a service issue, according to various implementations of the present disclosure.

FIG. 16 is a diagram illustrating an embodiment of a user interface 208 enabling a servicer to select service issues. If the service issues option 108 is selected in the user interface 100 of FIG. 9, the user interface 208 may be displayed. The user interface 208 includes a first option 210 to allow a servicer to indicate that the servicer was late arriving at the service location, the customer refused entry, and a delivery was not made. A second option 212 allows the servicer to indicate that the customer was not at home and the delivery was not made. A third option 214 allows the servicer to indicate that there are missing parts from one or more of the delivered items. In some embodiments, the item may still be delivered and the missing parts can be sent to the customer at a later time. Other embodiments may include not delivering and/or installing the item and scheduling the delivery/installation of a replacement item. A further option 216 allows the servicer to indicate that the item could not be delivered or installed. Any number of reasons for being unable to deliver or install might exist, such as, for example, a blocked entrance, the item being the wrong size and not fitting in a designated place, or other reasons.

Figure 17A:
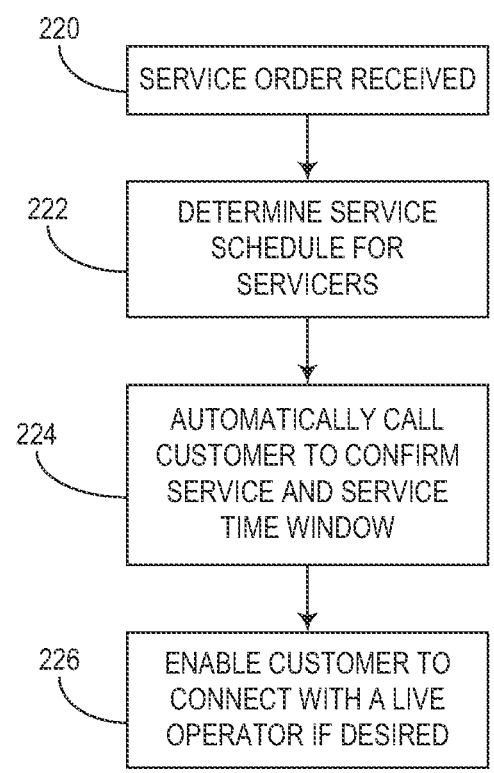
FIG. 17A is a flow diagram illustrating a method of a service order management system for performing a confirmation call to a customer, according to various implementations of the present disclosure.

FIG. 17A is a flow diagram illustrating an embodiment of a method of a service order management system for pre-calling a customer. According to some implementations, the service order management system described with respect to FIGS. 17A through 17D may be the service order management system 36 shown in FIG. 4 or any other system associated with the management of service orders. The terms "pre-call" and "pre-calling" refer to an automatic telephone call, e-mail, text message, or other communication made to the customer in advance of the scheduled service time to notify the customer of a time window during which the service is to be performed. In some embodiments, the pre-call may be made on the evening before the service day. The pre-call method in some implementations may be associated with the confirmation call module 72 shown in FIG. 6.

As indicated in block 220, a service order for a particular service is received. The service may include any type of service, such as a delivery, maintenance, repair, or other service. As indicated in block 222, the service schedules for one or more servicers are determined. The schedules may be grouped based on the service locations of multiple service orders received, the types of services to be performed, or other factors. As indicated in block 224, the method includes automatically calling or communicating with the customer to notified the customer of the scheduled service order and the service time window. The notification call may allow the customer to confirm the service order or provide feedback about whether the service and service time window are acceptable to the customer. For example, confirmation can be made by the user pressing a touch tone button on the telephone receiver, speaking a command to a voice recognition device, selecting a "confirm" or "yes" button in an e-mail, or by another method. In some embodiments, the customer may be enabled to re-schedule, cancel or postpone the scheduled service. As indicated in block 226, the method includes enabling the customer to connect with a live operator if desired. For example, the user may be prompted to press a touch tone button or speak a command to initiate connection with the live operator.

Figure 17B:
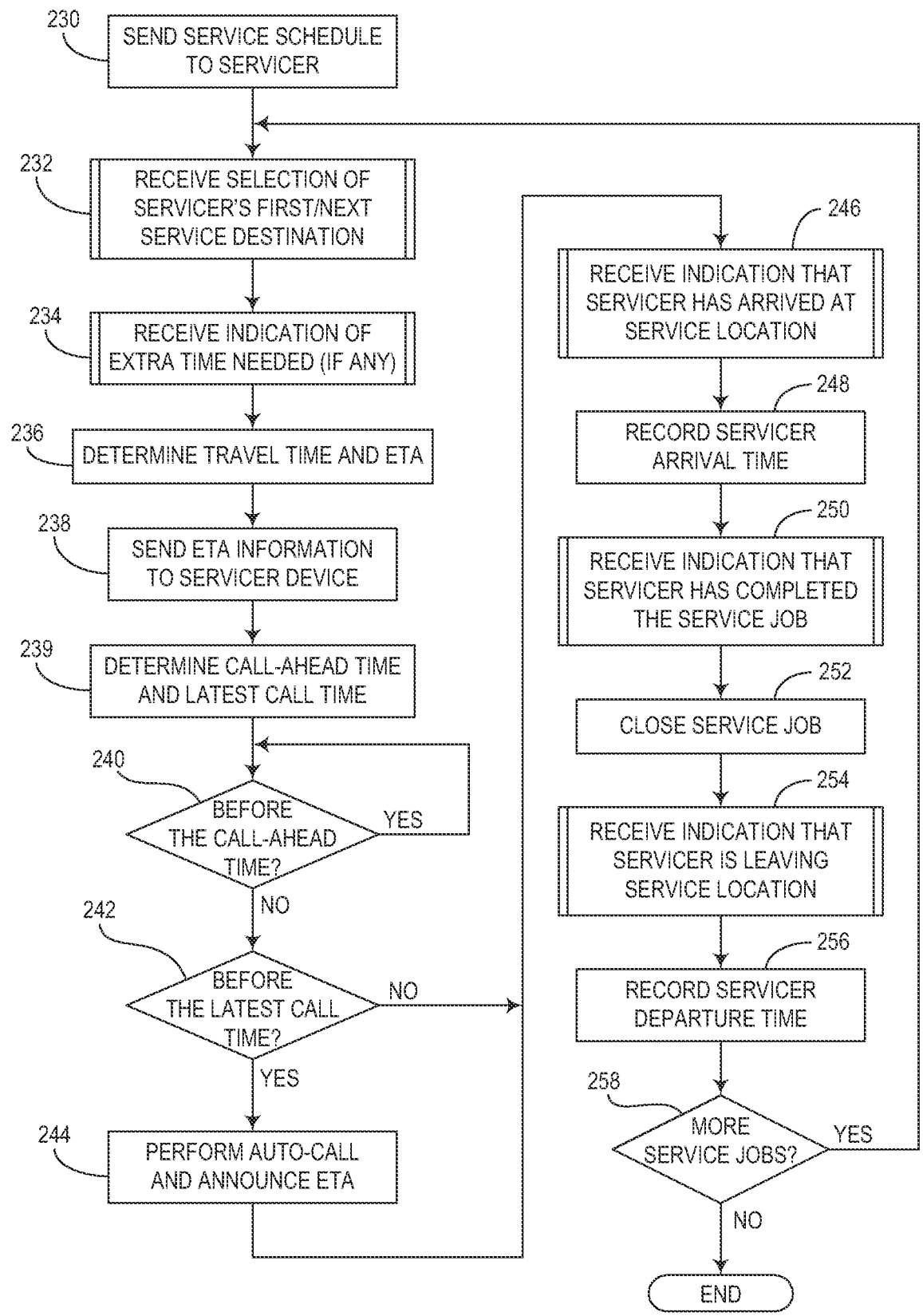
FIG. 17B is a flow diagram illustrating a method of a service order management system for tracking the location of a servicer, according to various implementations of the present disclosure.

FIG. 17B is a flow diagram illustrating an embodiment of a method of a service order management system for fulfilling a service order by a servicer. This method may be performed for any type of services to be performed. The method of FIG. 17B may be associated with the functions and operations of the service status receiving module 76 and ETA module 78 shown in FIG. 6.

The method includes sending a service schedule to a servicer, as indicated in block 230. The servicer in these implementations may be any member of a service team, such as a driver, assistant, or other member, regardless of whether the person actually performs the intended services. In some embodiments, the servicer may be given access to tools to help create an efficient schedule, based on pick-up locations (if applicable), service locations, estimated travel times and distances between service locations, left turn minimization algorithms, and/or other criteria. In some embodiments, multiple service schedules may be sent to multiple servicers, whereby the method may be repeated for each servicer.

As indicated in block 232, the method includes waiting to receive a selection of a servicer's first or next destination. The servicer first selects a first destination and thereafter selects the next destinations. Block 234 indicates that the method further includes receiving an indication of an extra time period needed, if any. An estimated travel time and ETA may be determined, as indicated in block 236. The calculated or determined travel time and/or ETA may be based on the servicer's current location at a particular time of day, the servicer's next destination, travel distance to the next destination, and other information. In some embodiments, the servicer may provide an estimated travel time and/or an ETA based on the estimated time period that it will take him or her to travel from his or her current location to the next destination location. In this embodiment, the determination of travel time or ETA in block 236 may include storing the travel time and/or ETA received from the servicer. When only one of the travel time or ETA is provided by the servicer, the other may be automatically calculated as well. Determining travel time or ETA may include adding or extending the time based on any extra time needed by the servicer, if any, as received in block 234. According to block 238, the method includes sending the ETA information to the servicer device for informing the servicer of the ETA, if the ETA or travel time does not originate from the servicer device.

As indicated in block 239, a call-ahead time and a latest call time are calculated. For the purpose of example, an ETA is calculated as being 3:40 p.m. The call-ahead time may be based on a predetermined advanced warning time before the ETA. The predetermined advanced warning time represents the period of time before the ETA when an automatic call is made to the customer to notify the customer of the ETA. The predetermined advanced warning time may be specified by the system and applied to all service orders in the same manner. According to various implementations, the predetermined advance warning time may be about one hour, 45 minutes, 30 minutes, or any system-defined time period for giving advanced warning of the ETA. Given that the predetermined advanced warning time is 30 minutes, the call-ahead time may be calculated in the above example as being 3:10 p.m. (i.e., the ETA of 3:40 minus 30 minutes).

The latest call time may be based on a minimum advanced time period with respect to the ETA. For instance, if the present time is too close to the ETA, the method may be configured to skip the automatic call, particularly because the servicer may be ahead of schedule and already present at the service destination. The minimum advanced time period represents the minimum amount of time prior to the ETA when an automatic call is made. According to various implementations, the minimum advanced time period may be about 5 minutes, 10 minutes, or any system-defined time period. The minimum advanced time period may be specified by the system and applied to all service orders in the same manner. Given that the minimum advanced time period is 5 minutes, the latest call time may be calculated in the above example as being 3:35 p.m. (i.e., the ETA of 3:40 minus 5 minutes).

As indicated in decision block 240, it is determined whether or not the present time is before the call-ahead time. If so, the method loops back to decision block 240 until the call-ahead time is reached. When the call-ahead time has arrived, the method proceeds to decision block 242. For example, if decision block 240 is performed at 2:50 p.m. and the call-ahead time is 3:10 p.m., the decision block 240 does not proceed to block 242 until 3:10. As indicated in decision block 242, it is determined whether or not the present time is before the latest call time. For example, if the call-ahead time has long passed and the present time is too close to the ETA (i.e., the present time is not before the latest call time), the method then skips block 244 and goes to block 246. However, if decision block is performed before the latest call time, the method proceeds from decision block 242 to block 244.

According to block 244, the method includes performing an en route auto-call to the customer, or specified recipient in the service order, and announcing the ETA. The en route call may be associated with the en route call module 74 shown in FIG. 6. The auto-call may be an automatically generated telephone call to the customer's residence to announce an estimate of when the servicer might arrive. In some implementations, the auto-call may include enabling the customer to provide feedback in response to the call. For example, the customer may be enabled to indicate a confirmation that the customer is available to receive the service, to indicate that the customer wishes to re-schedule the service, to indicated that the customer wishes to speak with an operator, or other options. Re-scheduling may be executed by further customer input and/or by communicating with a live operator.

As indicated in block 246, the method may receive an indication when the servicer has actually arrived at the service destination location. In block 248, the method includes recording the arrival time of the servicer at the service destination location. As indicated in block 250, the method waits until an indication is received that the servicer has completed the service job. Upon receiving this indication, the service job is closed, as indicated in block 252. According to block 254, an indication is received that the servicer is leaving the service location. Block 256 includes recording the servicer's departure time. As indicated in decision block 258, it is determined whether or not any more service jobs are to be performed. If not, the method ends. If more service jobs are to be performed, the method returns back to block 232 and the process is repeated for the next destination.

Figure 17C:
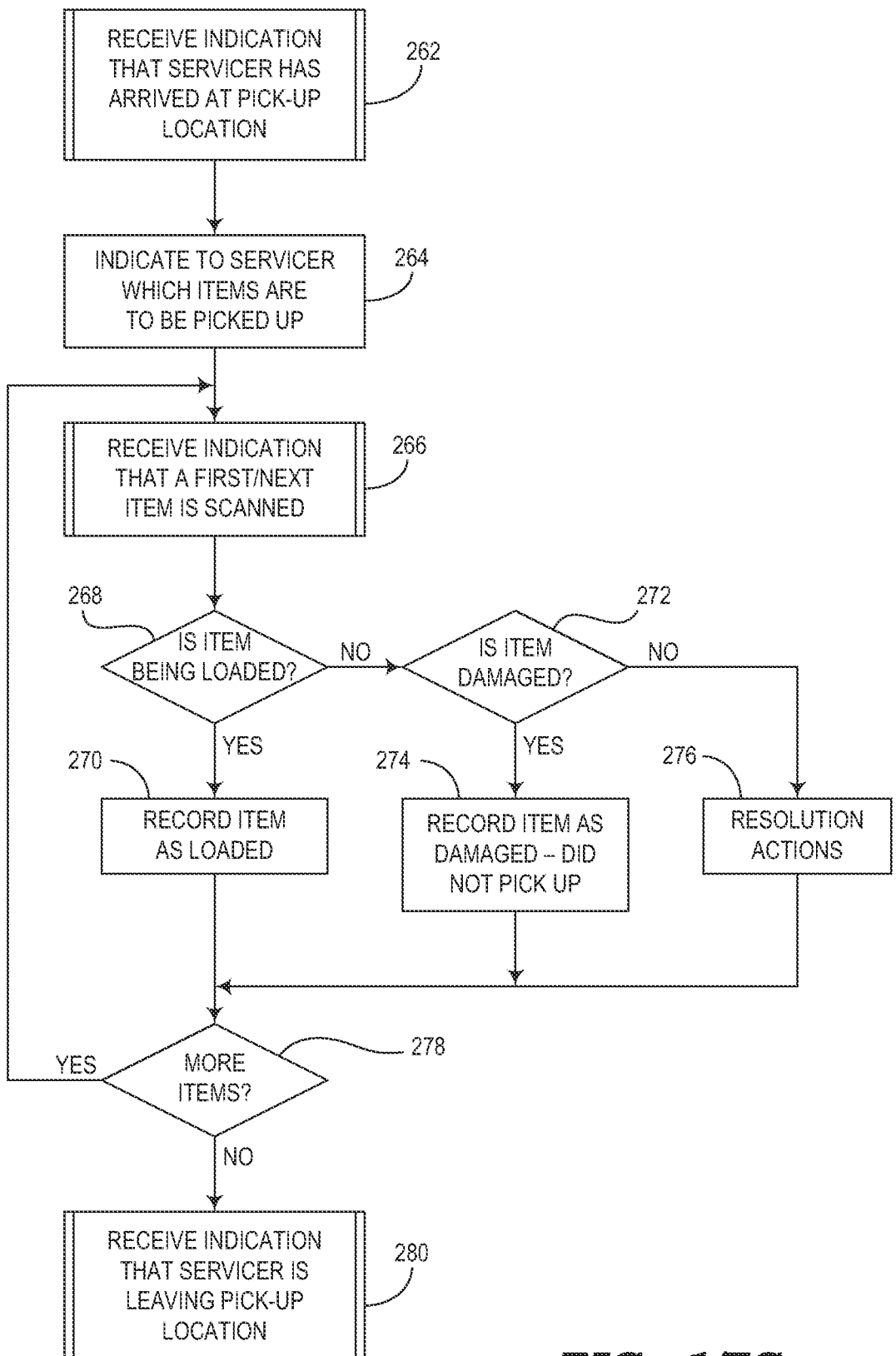
FIG. 17C is a flow diagram illustrating a method of a service order management system for managing the loading of items for delivery, according to various implementations of the present disclosure.

FIG. 17C is a flow diagram illustrating an embodiment of a method of a service order management system for managing the loading of items for delivery. In particular, this method applies to situations where a servicer travels to a pick-up location to receive items to be delivered to one or more customers. As illustrated, the method of FIG. 17C includes receiving an indication when the servicer eventually arrives at the pick-up location, as indicated in block 262. According to block 264, the method includes indicating to the servicer which items are to be picked up.

As indicated in block 266, the method includes receiving an indication when a first item is eventually scanned. When this process is repeated at a later time, if necessary, the method receives an indication that a next item is scanned. As indicated in decision block 268, it is determined whether or not the scanned item is being loaded. If so, the method proceeds to block 270, which indicates that the item is recorded as loaded. In some embodiments, block 270 may further include removing the loaded item from a list of items to be loaded, placing a check next to the loaded item, or indicating in any other manner the loading of the item. This information may be entered in a database associated with the service order management system. According to various implementations, the item list may be communicated to a servicer device for display. If the item is not being loaded, the method proceeds from decision block 268 to decision block 272, which includes determining if the item is damaged. If so, the item is recorded as being damaged and is not picked up. If the item is not damaged, the method proceeds to block 276 and resolution actions can be taken as necessary.

From blocks 270, 274, and 276, the method flows to decision block 278, which determines if more items are to be scanned. If not, the method proceeds to block 280 and the method receives an indication when the servicer eventually leaves the pick-up location. After block 280, the method ends. If it is determined in decision block 278 that more items are to be scanned, the method returns back to block 266 for the next item.

Figure 17D:
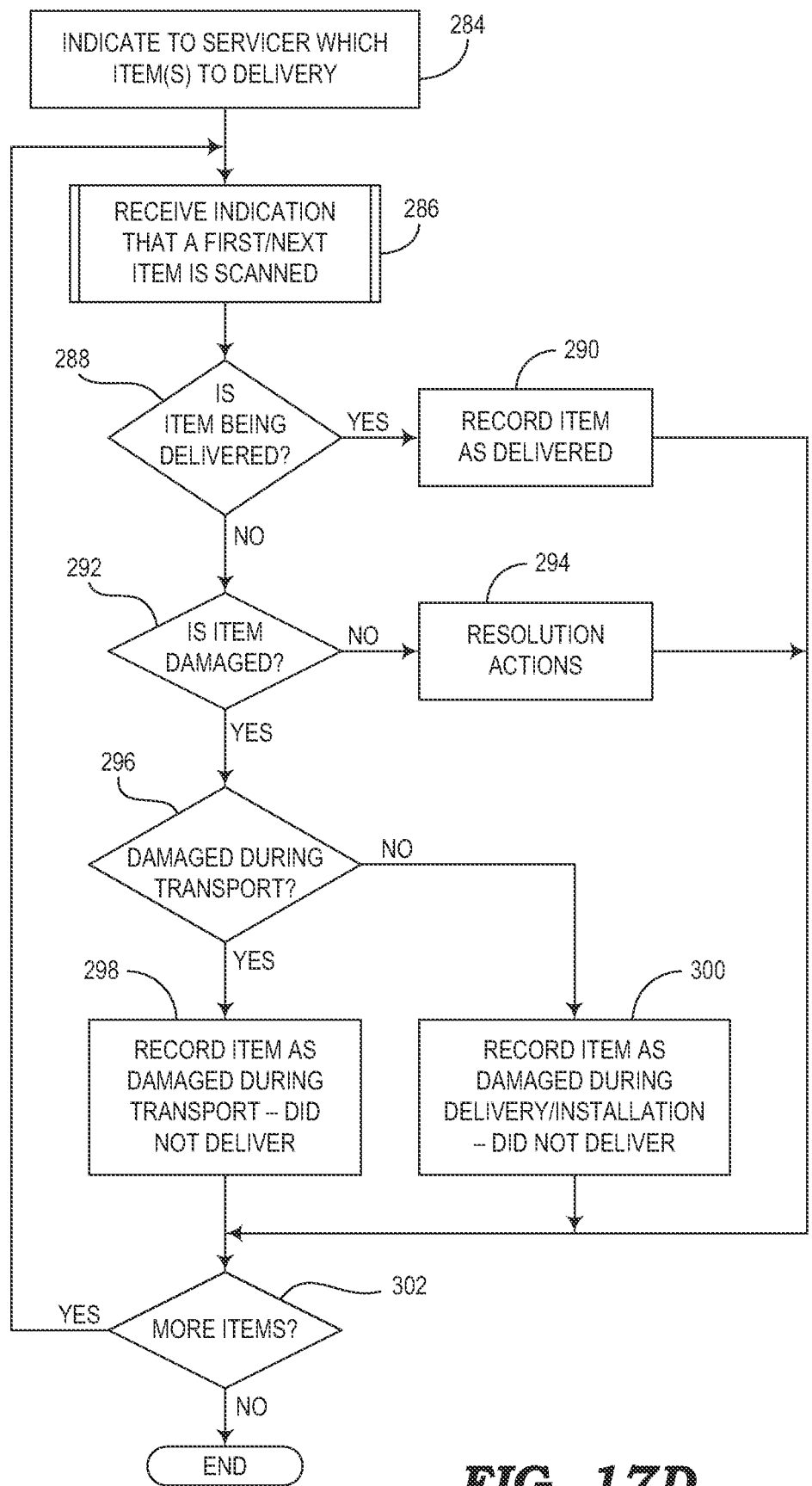
FIG. 17D is a flow diagram illustrating a method of a service order management system for managing the delivery of items, according to various implementations of the present disclosure.

FIG. 17D is a flow diagram illustrating an embodiment of a method of a service order management system for managing deliveries. Particularly, the method of FIG. 17D may apply to delivering one or more items at a delivery service location. This method may be repeated by each servicer for each delivery service location. As indicated in block 284, the method indicates to the servicer which item or items are to be delivered to a particular service location. As indicated in block 286, the method receives an indication when a first item is eventually scanned. When this process is repeated at a later time, if necessary, the method includes receiving an indication that a next item is scanned.

According to decision block 288, it is determined whether or not the scanned item is being delivered. If so, the method goes to block 290, which indicates that the item is recorded as delivered. However, if the item is not being delivered, then the method flows from decision block 288 to decision block 292. In block 292, it is determined if the item is damaged. If the item is not damaged, the method proceeds to block 294 and resolution actions can be taken to complete the delivery, if possible. If it is determined in decision block 292 that the item is damaged, the method proceeds to decision block 296.

As indicated in block 296, the method determines if the item was damaged during transport. If so, the method goes to block 298, which indicates that the item is recorded as being damaged during transport and was not delivered. However, if it was not damaged during transport, it can be assumed that it was damaged during delivery or installation. In this case, the method goes to block 300 and the item is recorded as being damaged during delivery or installation and was not delivered. From blocks 290, 294, 298, and 300, the method goes to decision block 302, which determines whether or not additional items are to be delivered to the particular service location. If more items, the method loops back to block 286 for the next item. If no more items, the method ends.

Figure 18A:
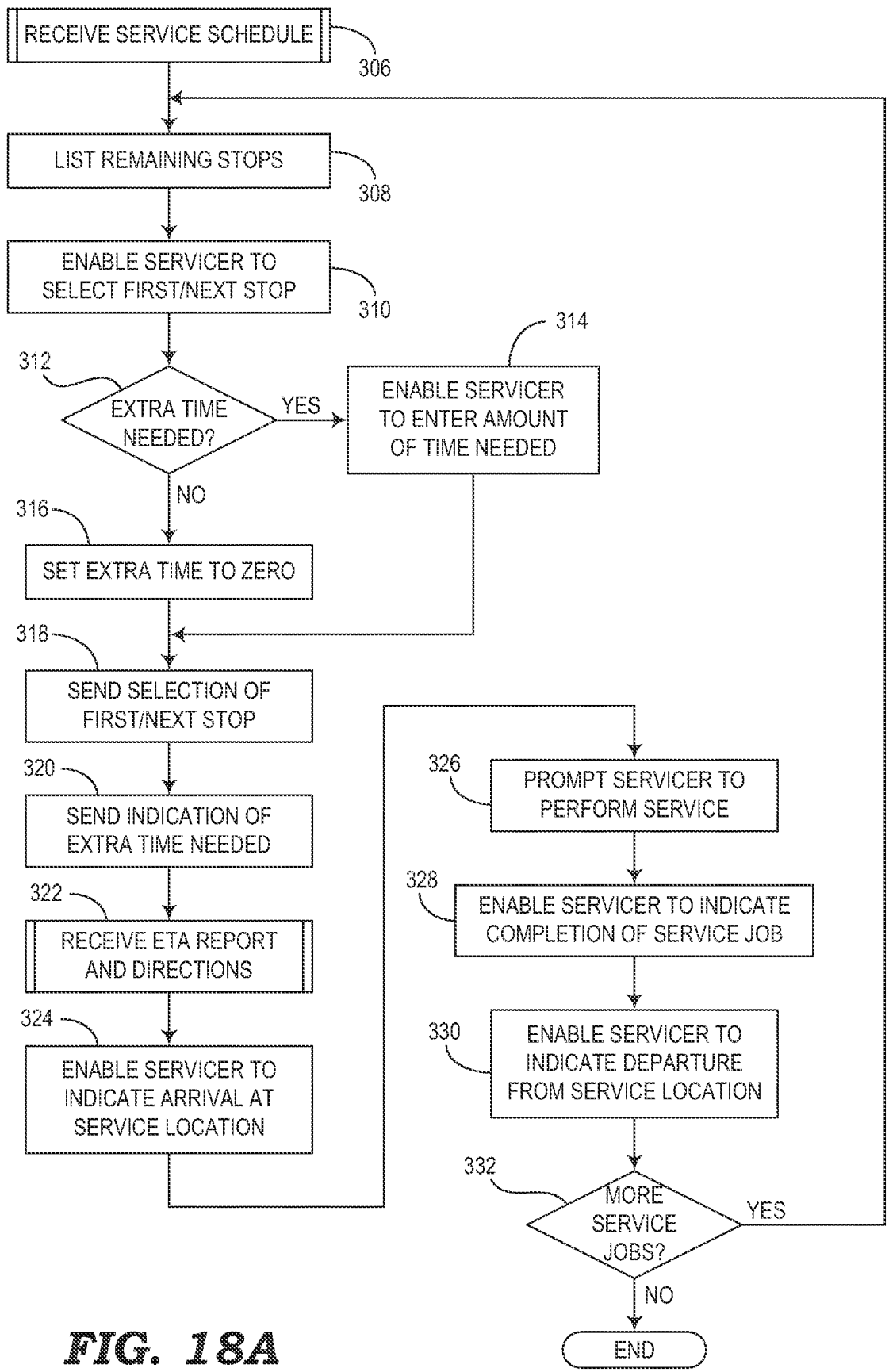
FIG. 18A is a flow diagram illustrating a method of a servicer device for managing a service schedule, according to various implementations of the present disclosure.

FIG. 18A is a flow diagram illustrating an embodiment of a method of a servicer device for managing a service schedule. The method of FIGS. 18A through 18C may be operated by the servicer device 82 of FIG. 7 or by any other mobile device used by a servicer to communicate with a service order management system. Also, this method may be applicable to any type of service to be performed. As illustrated, the method of FIG. 18A includes receiving a service schedule, as indicated in block 306. The service schedule may be applicable only to the servicer using the particular servicer device. If multiple servicer devices are being used by multiple servicers, a specific service schedule is received by each of the respective servicer devices as appropriate.

The method further includes listing the remaining destinations, as indicated in block 308. According to block 310, the method enables the servicer to select a first destination from the list of remaining destinations. When repeated for additional destinations, block 310 is configured to enable the servicer to select the next destination. In accordance with decision block 312, it is determined whether the servicer requests an extra time period in order to travel from the servicer's current location to the next destination. If an extra time period is needed, the flow proceeds to block 314 and the method enables the servicer to enter the extra time period needed. If no extra time period is needed, the method proceeds from block 312 to block 316, which indicates that the extra time period is set to zero. From blocks 314 and 316, the method proceeds to block 318.

As indicated in block 318, the method includes sending the selection (from block 310) of the first or next destination to the service order management system. As indicated in block 320, another indication is sent of the extra time period that is needed to reach the next destination. According to block 322, the method includes receiving an ETA report to the next destination, and directions if necessary, from the service order management system.

Block 324 indicates that the servicer is enabled to indicate an arrival at the service location. In some embodiments, this indication may be made based on automated GPS location determining processes. As indicated in block 326, the servicer may be prompted according to some embodiments to perform the designated service. In block 328, it is indicated that the method includes enabling the servicer to indicate the completion of the service job. According to block 330, the servicer is enabled to indicate departure from the service location. As indicated in decision block 332, it is determined whether or not there are more service jobs to perform. If so, the method loops back to block 308 and the servicer proceeds with another service destination. If no more service jobs are to be done, the method ends.

Figure 18B:
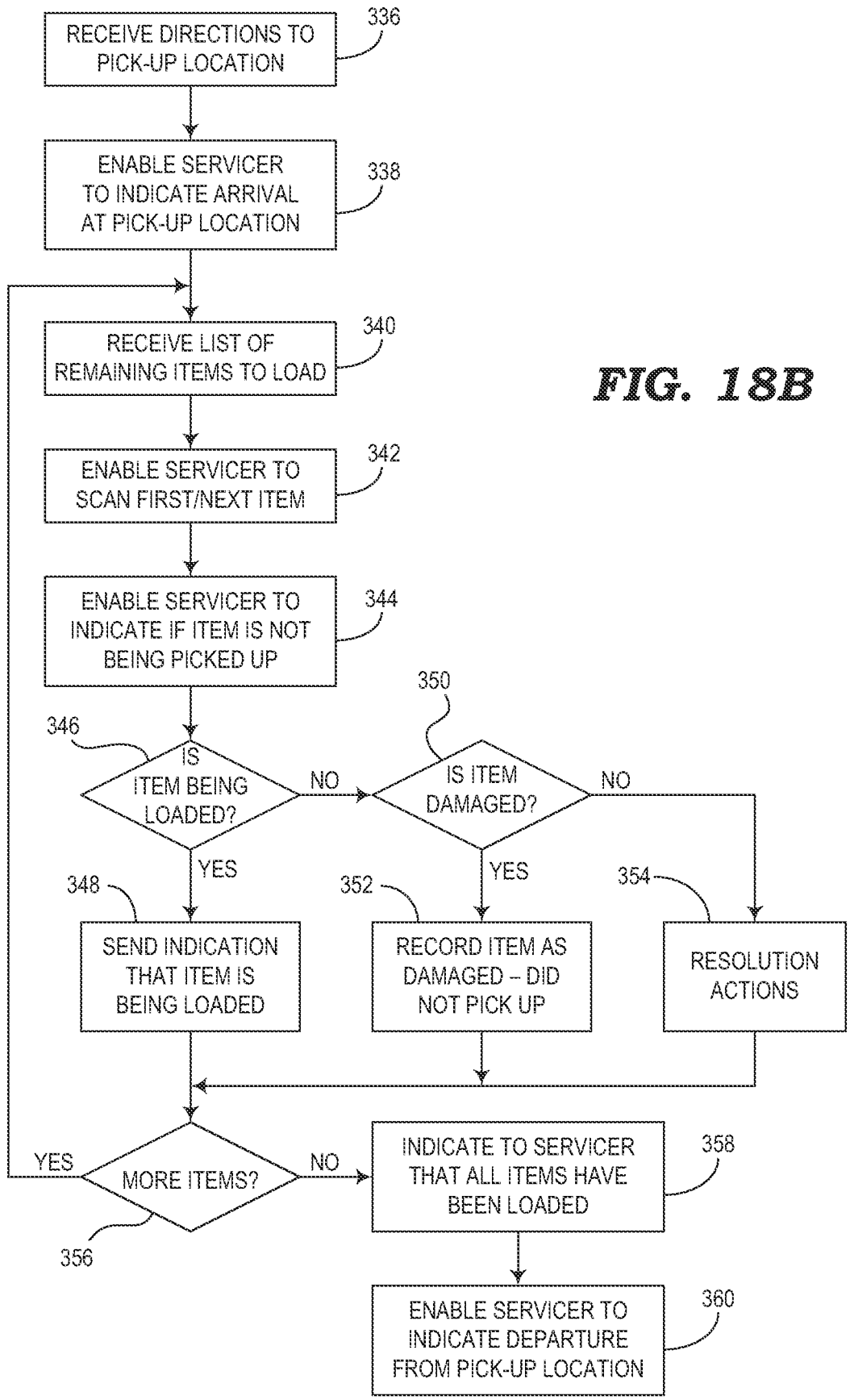
FIG. 18B is a flow diagram illustrating a method of a servicer device for managing the loading of items for delivery, according to various implementations of the present disclosure.

FIG. 18B is a flow diagram illustrating an embodiment of a method of a servicer device for managing the loading of items for delivery. This method may be particular to delivery services where items to be delivered are picked up from a loading area. As indicated in block 336, the method includes receiving directions to the pick-up location, if necessary. In block 338, the method includes enabling the servicer to indicate the arrival at the pick-up location. Upon arrival, the method further includes receiving a list of items to load onto the servicer's vehicle, as indicated in block 340. According to block 342, the servicer is enabled to scan the first item. When repeated at a later time, the servicer is enabled to scan the next item.

As indicated in block 344, the servicer is enabled to indicate if the scanned item is not being loaded or picked up. In decision block 346, it is determined whether or not the item is being loaded. If so, the method proceeds to block 348 and an indication is sent that the scanned item is being loaded. If not loaded, the method diverts to decision block 350 and it is determined whether the scanned item is damaged. If so, the method goes to block 352 and the item is recorded as being damaged and was not picked up. If not damaged, the method goes to block 354 and resolution actions can be taken as needed. In some embodiments, the order of processes may be rearranged such that the process of determining if an item is to be loaded may be made before the item is scanned.

From blocks 348, 352, and 354, the method proceeds to decision block 356 and it is determined whether more items are to be picked up. If so, the method loops back to block 340 and the process is repeated for the remaining items. If no more items are to be loaded, the method proceeds from block 356 to block 358.

As indicated in block 358, the method includes indicating to the servicer that all items have been loaded. As indicated in block 360, the servicer is enabled to indicate the departure from the pick-up location.

Figure 18C:
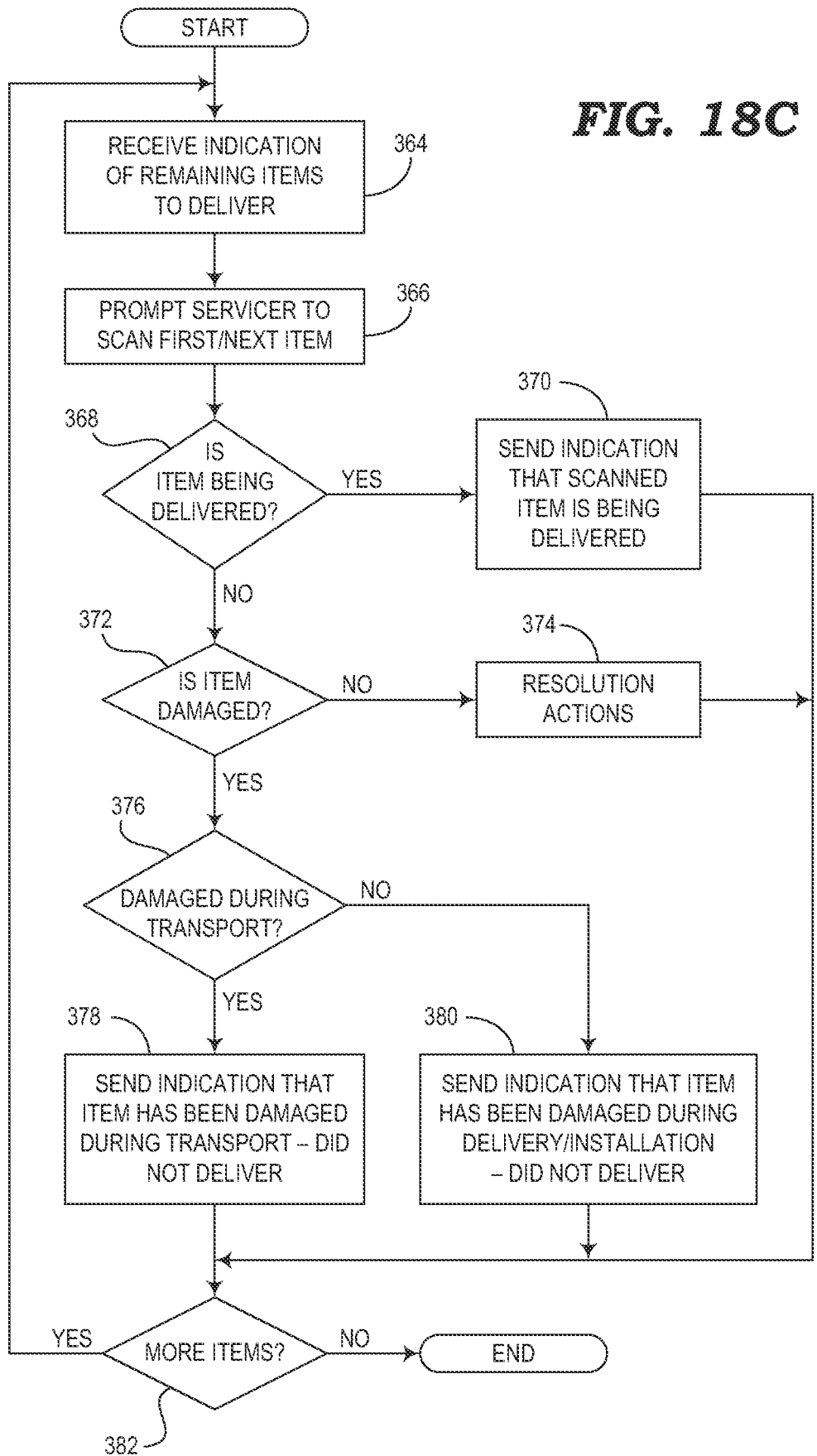
FIG. 18C is a flow diagram illustrating a method of a servicer device for managing the delivery of items, according to various implementations of the present disclosure.

FIG. 18C is a flow diagram illustrating an embodiment of a method of a servicer device for managing deliveries. This method may be applicable to the delivery of one or more items when the servicer has arrived at a customer's location. As indicated in block 364, an indication is received on the servicer device of the items, or remaining items, to deliver to the customer. According to block 366, the method includes prompting the servicer to scan a first or next item.

As indicated in decision block 368, it is determined whether or not the item is being delivered. If so, the method proceeds to block 370 and an indication is sent that the scanned item is being delivered. If the item is not to be delivered, the method goes to decision block 372 and it is determined whether the item is damaged. If so, the method proceeds to decision block 376. If not, the method proceeds to block 374 and resolution actions can be taken as necessary.

Decision block 376 includes determining whether the item was damaged during transport. If so, the method goes to block 378 and an indication is sent that the item has been damaged during transport and has not been delivered. If the item was not damaged during transport, it can assumed that the item was damaged during delivery or installation and the method proceeds to block 380 and indication is sent that the item was damaged during delivery or installation and was not delivered. From blocks 370, 374, 378, and 380, the method flows to decision block 382 and it is determined whether more items are to be delivered. If more items are to be delivered, the method returns back to block 364 and the process is repeated for the next item. If no more items are to be delivered, the method ends.

The flow diagrams shown in FIGS. 17A through 18C show the architecture, functionality, and operation of possible implementations of the service order processing device 46 of FIG. 5. In this regard, each block may represent a module, segment, portion of code, etc., which comprises one or more executable instructions for performing the specified logical functions. It should be noted that the functions described with respect to the blocks may occur in a different order than shown. For example, two or more blocks may be executed substantially concurrently, in a reverse order, or in any other sequence depending on the particular functionality involved.

The order management program 52, which comprises an ordered listing of executable instructions for implementing logical functions, may be embodied in any computer-readable medium for use by any combination of instruction execution systems or devices, such as computer-based systems, processor-controlled systems, etc. The computer-readable medium may include one or more suitable physical media components configured to store the software, programs, or computer code for a measurable length of time. The computer-readable medium may be any medium configured to contain, store, communicate, propagate, or transport programs for execution by the instruction execution systems or devices.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising:
   receiving, by a processing device, a plurality of service orders from at least one business, each of the plurality of service orders including information related to one of a plurality of service jobs to be performed for customers at a plurality of service destinations, the information including at least a name, telephone number, address, and purchased item associated with a customer;
   determining, by the processing device, a service schedule for a servicer based on the addresses included in the plurality of service orders;

for each service order in the service schedule, determining, by the processing device, whether the telephone number associated with the service order is on a do not call list;

for each service order associated with a telephone number that is determined to not be on the do not call list, automatically placing, by the processing device, a first telephone call, via a hardware interface device, to the telephone number to obtain confirmation of the service job and notify the customer of a service time window and enabling a recipient of the first telephone call to connect with a live operator if desired;

transmitting, by the processing device, the service schedule to a servicer device associated with the servicer, the service schedule including a plurality of names and addresses, each of the plurality of names and addresses corresponding to one of the plurality of service orders;

receiving, by the processing device, an indication from the servicer device when the servicer has arrived at a loading location;

transmitting, by the processing device, to the servicer device a list of purchased items to be loaded onto a vehicle associated with the servicer;

receiving, by the processing device, an indication from the servicer device that a purchased item to be delivered has been scanned by the servicer;

receiving, by the processing device, an indication from the servicer device as to whether or not the scanned item is being loaded;

upon receiving an indication from the servicer device that the scanned item is not being loaded, receiving an indication that the scanned item is damaged;

recording, by the processing device, that the scanned item is damaged if it is not loaded;

receiving, by the processing device, an indication from the servicer device when the servicer is leaving the loading location, receiving, by the processing device, a selection by the servicer on the servicer device of a service destination from the service orders in the service schedule;

prompting, by the processing device, the servicer on the servicer device to provide an extra time period value representing an amount of extra time needed to reach the service destination through the user interface displayed on the display screen of the servicer device;

adding, by the processing device, the extra time period value to an initial estimated time of arrival (initial ETA) associated with the service destination to produce a modified ETA;

calculating, by the processing device, a call-ahead time and a latest call time for a second telephone call, the call-ahead time and the latest call time being calculated based on the modified ETA and together defining a predetermined advanced-warning time period during which the customer may be notified of the modified ETA, wherein the call-ahead time is a first predetermined time period prior to the modified ETA, and wherein the latest call time is a second predetermined time period prior to the modified ETA, the first predetermined time period being greater than the second predetermined time period;

determining if a present time is after the call-ahead time;

when the present time is after the call-ahead time, determining if the present time is before the latest call time;

when the present time is after the call-ahead time and before the latest call time, automatically placing, by the processing device, the second telephone call, via the hardware interface device, to the telephone number to notify the customer of the modified ETA, the second call being placed no earlier than the call-ahead time and no later than the latest call time, and wherein receiving the selection of the service destination and the extra time period value enables the processing device to produce the modified ETA and to notify the customer of the modified ETA which is more accurate than the initial ETA;

receiving, by the processing device, an indication from the servicer device that the servicer has arrived at the service destination;

recording, by the processing device, the time that the servicer arrived at the service destination;

communicating, by the processing device to the servicer device, information regarding a purchased item to be delivered at the service destination, the information regarding the purchased item to be delivered being displayed to the servicer through the user interface on the display screen of the servicer device;

receiving, by the processing device, an indication from the servicer device that the purchased item to be delivered at the service destination has been scanned by the servicer;

receiving, by the processing device, an indication from the servicer device that the servicer is not delivering the scanned item due to a service issue identified by the servicer at the service destination;

receiving, by the processing device, information from the servicer device identifying the service issue that prevented the servicer from delivering the purchased item, the information identifying the service issue comprising a service issue selected by the servicer from a list of possible service issues displayed through the user interface on the display screen of the servicer device; and recording, by the processing device, the service issue associated with the purchased item.

2. The method of claim 1, wherein automatically calling the telephone number comprises utilizing an integrated voice response (IVR) device.

3. The method of claim 1, further comprising:
enabling, by the servicer device, the servicer to indicate an arrival at the service destination;
enabling, by the servicer device, the servicer to indicate completion of the selected service job; and
enabling, by the servicer device, the servicer to indicate departure from the service destination.

4. The method of claim 1, wherein determining a service schedule for a servicer based on the plurality of service orders is based on the types of services to be performed.

5. The method of claim 1, wherein prompting the servicer to provide the extra time period value comprises receiving a selection of one of a plurality of extra time period values displayed to the servicer through the user interface on the display screen of the servicer device.

6. The method of claim 1, wherein prompting the servicer to provide the extra time period value comprises providing a field in the user interface on the display screen of the servicer device enabling the servicer to enter the extra time period value.

7. The method of claim 1, wherein the service issue encountered at the service destination comprises the customer not being present at the service destination.

8. The method of claim 1, wherein the service issue encountered at the service destination comprises parts missing from the purchased item.

9. The method of claim 1, wherein the service issue encountered at the service destination comprises an inability to access the service destination.

\* \* \* \* \*